(12) United States Patent
Yokota et al.

(10) Patent No.: US 8,643,814 B2
(45) Date of Patent: Feb. 4, 2014

(54) LIQUID CRYSTAL DEVICE AND PROJECTION-TYPE DISPLAY APPARATUS

(75) Inventors: Tomoki Yokota, Chino (JP); Hiroyuki Hara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 138 days.

(21) Appl. No.: 13/429,510

(22) Filed: Mar. 26, 2012

(65) Prior Publication Data

US 2012/0249919 A1    Oct. 4, 2012

(30) Foreign Application Priority Data

Mar. 29, 2011    (JP) ................. 2011-073574

(51) Int. Cl.
*G02F 1/1343*    (2006.01)

(52) U.S. Cl.
USPC ............ 349/139; 349/143; 349/149; 349/151

(58) Field of Classification Search
USPC ......... 349/5, 123, 139, 143, 149, 151; 345/87
See application file for complete search history.

(56) References Cited

U.S. PATENT DOCUMENTS

2008/0055529 A1    3/2008    Shirasaka et al.
2012/0086878 A1*   4/2012    Mochiku ..................... 349/5

FOREIGN PATENT DOCUMENTS

| JP | 2008-58497 A | 3/1920 |
| JP | 4-126617 A | 4/1992 |
| JP | 6-289408 A | 10/1994 |
| JP | 2009-92697 A | 4/2009 |

* cited by examiner

*Primary Examiner* — Edward Glick
*Assistant Examiner* — Tai Duong
(74) *Attorney, Agent, or Firm* — ALG Intellectual Property, LLC

(57) ABSTRACT

In at least one embodiment of the disclosure, a liquid crystal device comprises a plurality of conductive patterns formed of a conductive film in a peripheral region between an image display region and a sealing member. The conductive patterns are formed at a same layer as a plurality of pixel electrodes. An insulation film is formed on a side facing a counter substrate so as to correspond to the plurality of conductive patterns and a plurality of pixel electrodes. Peripheral electrodes are formed in a region overlapping the plurality of conductive patterns in a plan view on a side on which the counter substrate is located so as to correspond to the insulation film in the peripheral region.

14 Claims, 9 Drawing Sheets

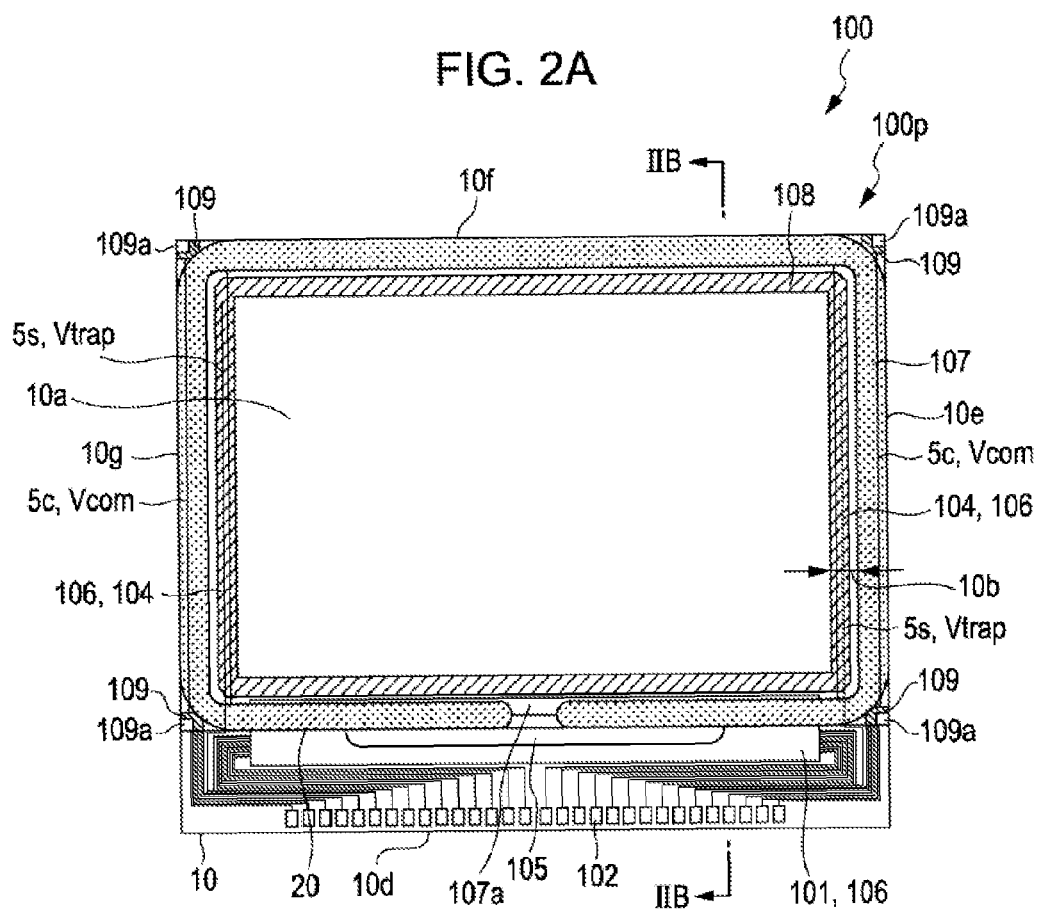
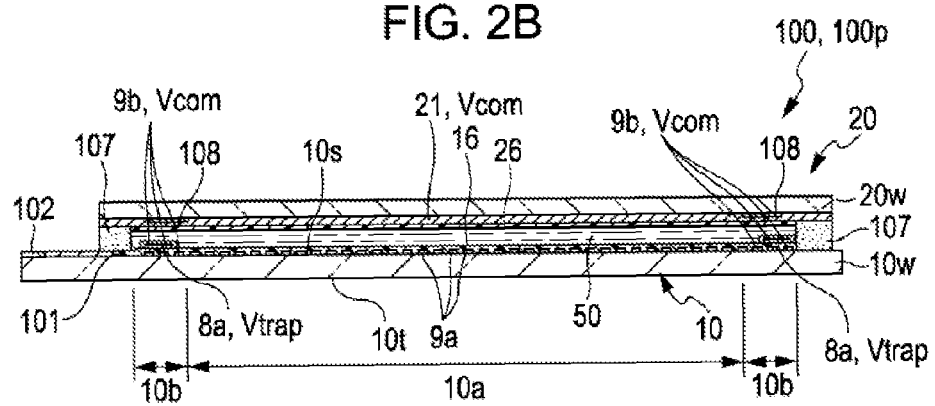

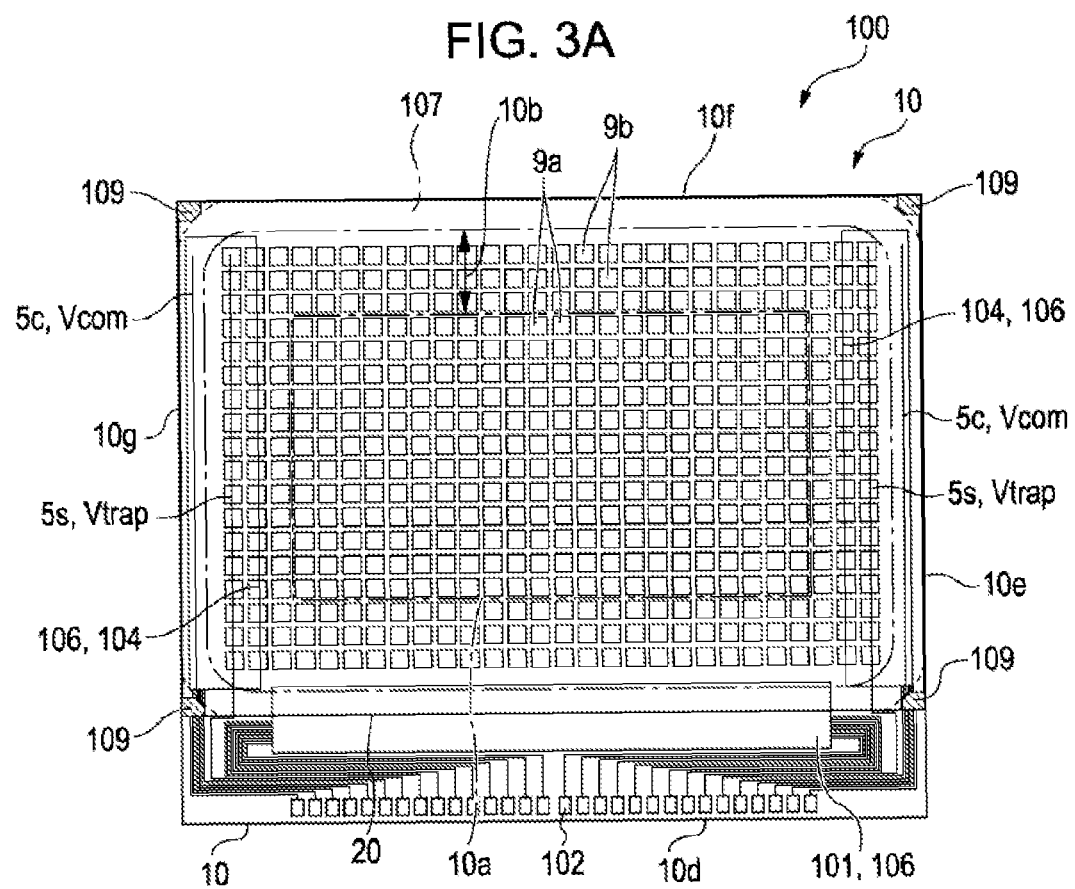
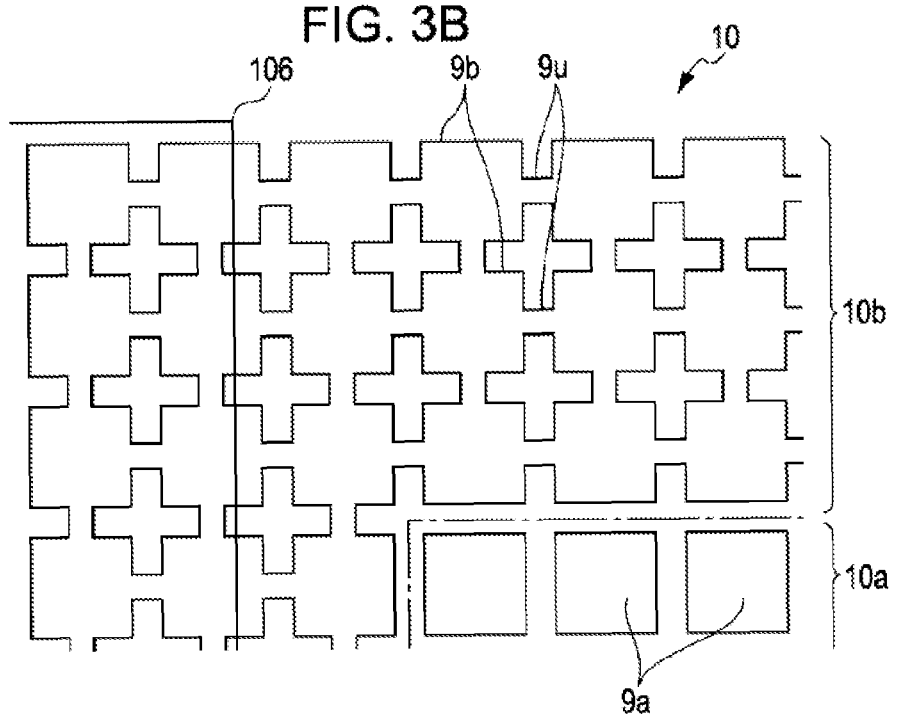

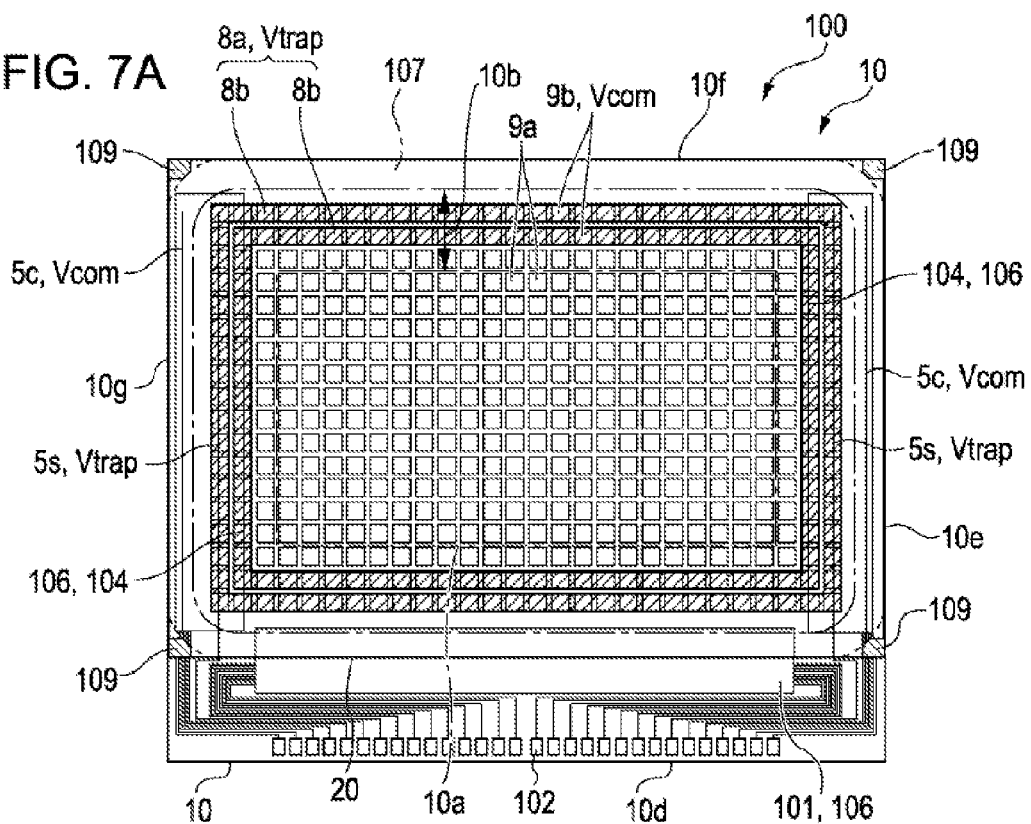
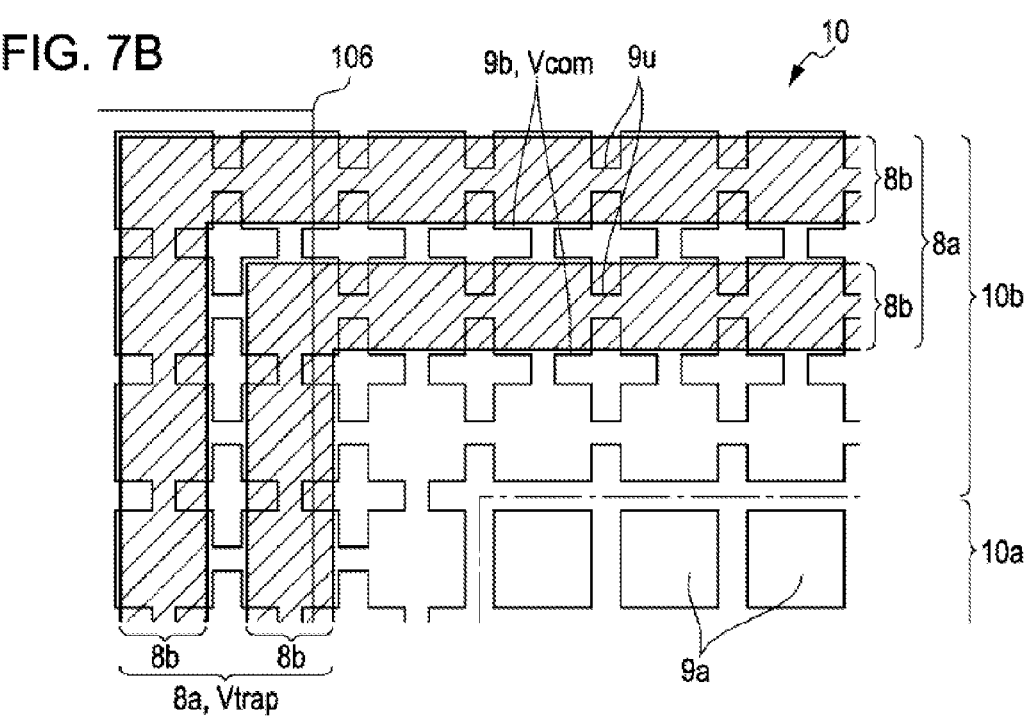

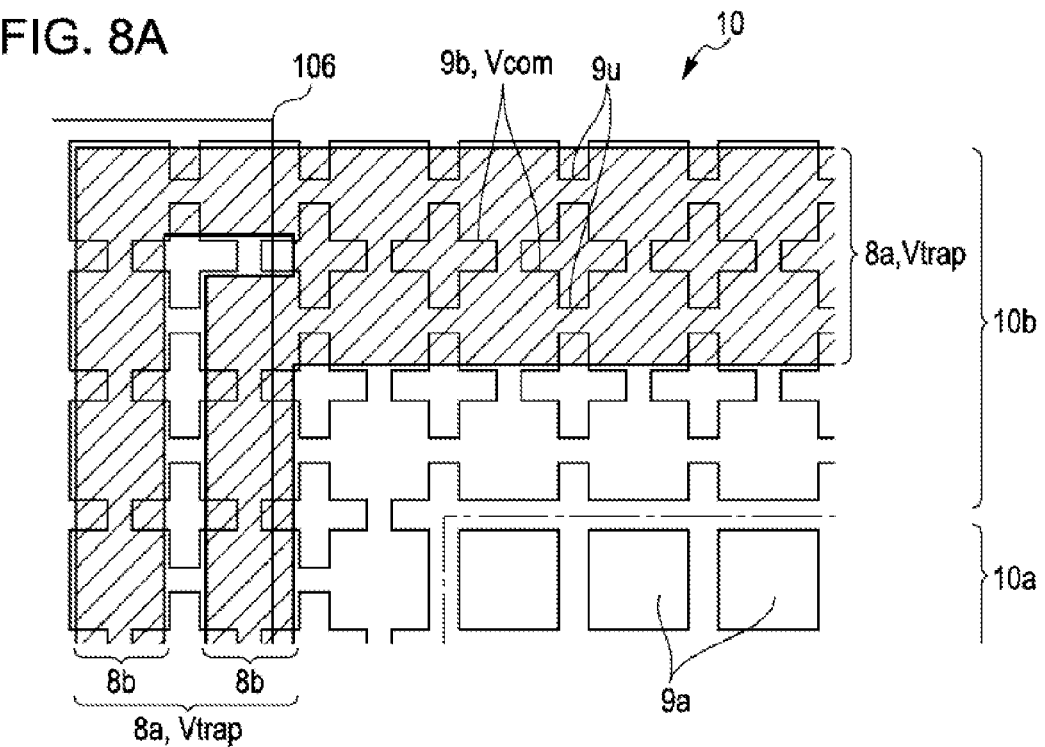
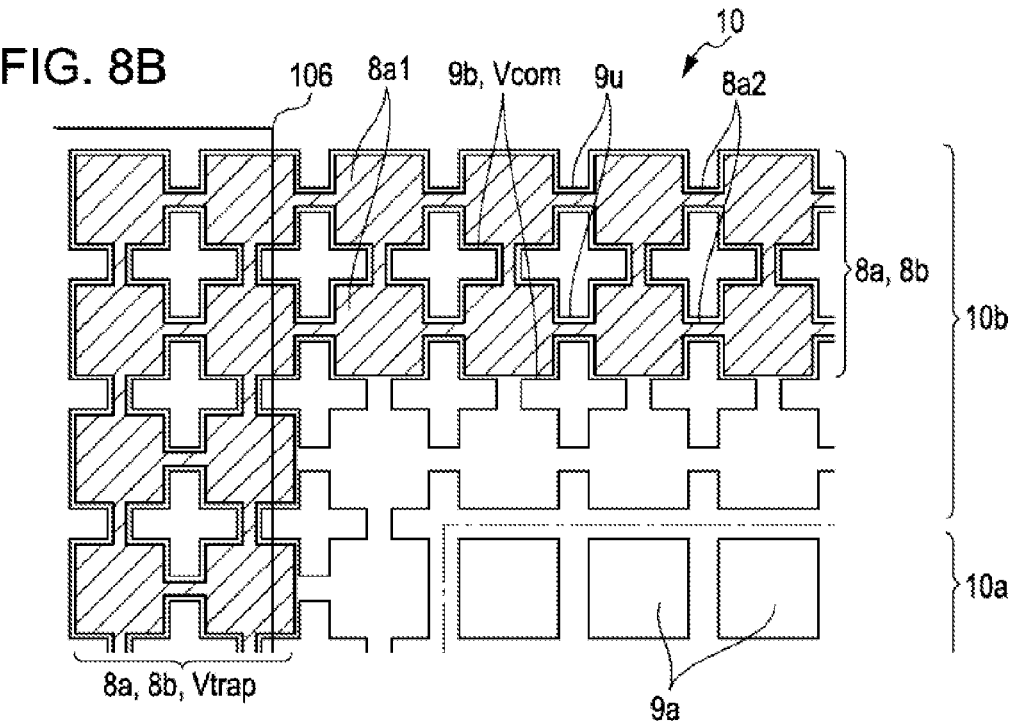

LIQUID CRYSTAL DEVICE AND PROJECTION-TYPE DISPLAY APPARATUS

CROSS-REFERENCE

The present application claims priority from Japanese Patent Application No. 2011-073574 filed on Mar. 29, 2011 which is hereby incorporated by reference in its entirety.

BACKGROUND

In a liquid crystal device, an element substrate having an image display region where a plurality of pixel electrodes is arranged on one surface and a counter substrate having a common electrode to which a common potential is applied are bonded by a sealing member. Moreover, a liquid crystal layer is held inside a region surrounded by the sealing member between the element substrate and the counter substrate. The liquid crystal device is used as a direct-view display device or a light valve of a projection-type display apparatus.

In such a liquid crystal device, image sticking (smear) or the like of an image, which causes deterioration in display quality, occurs when ionic impurities mixed at injection time of liquid crystal or ionic impurities eluted from the sealing member cohere inside the image display region by driving of the liquid crystal device. Accordingly, there has been suggested a technique for preventing the ionic impurities from cohering inside the image display region by forming peripheral electrodes outside the image display region and by drawing and retaining the ionic impurities in the peripheral electrodes (see, e.g., FIG. 4 of JP-A-2008-58497).

More specifically, according to the technique such as disclosed in FIG. 4 of JP-A-2008-58497, first and second peripheral electrodes are formed so as to surround the circumference of the image display region, different potentials are applied to the first and second peripheral electrodes, the polarities of the potentials to be applied to the first and second peripheral electrodes for each frame are reversed, and minute fluctuation of the liquid crystal and the movement of the ionic impurities are achieved by a transverse electric field between the first and second peripheral electrodes.

However, a problem may arise in that the peripheral electrodes for trapping the ionic impurities may not be disposed at appropriate positions when a difference in height between the image display region and a peripheral region is reduced by forming dummy pixel electrodes in the peripheral region through a conductive film located at the same layer of that of the pixel electrode and the inside of the image display region is flattened. For example, when the peripheral electrodes for trapping the ionic impurities are formed on the inner side of the regions where the dummy pixel electrodes are formed, a distance between the peripheral electrodes and the image display region becomes too short. Therefore, the ionic impurities trapped by the peripheral electrodes have an influence on the image display region. On the other hand, when the peripheral electrodes for trapping the ionic impurities are formed on the outer side of the regions where the dummy pixel electrodes are formed, the ionic impurities inside the image display region may rarely be attracted by the peripheral electrodes.

SUMMARY

In accordance with certain embodiments of the disclosure, a liquid crystal device is provided in which peripheral electrodes for trapping ionic impurities are arranged at appropriate positions even when dummy pixel electrodes are formed and a projection-type display apparatus including the liquid crystal device.

According to an aspect of the disclosure, there is provided a liquid crystal device including an element substrate in which an image display region, at which a plurality of pixel electrodes is arranged, is formed on one surface of the element substrate; a counter substrate in which a common electrode, to which a common potential is applied, is formed; a sealing member which bonds the element substrate and the counter substrate; and a liquid crystal layer which is held in a region surrounded by the sealing member between the element substrate and the counter substrate. The one surface of the element substrate includes a plurality of conductive patterns which is formed of a conductive film at the same layer of that of the plurality of pixel electrodes in a peripheral region sandwiched between the image display region and the sealing member, an insulation film which is formed on a side on which the counter substrate is located so as to correspond to the plurality of conductive patterns and the plurality of pixel electrodes, peripheral electrodes which are formed in a region overlapping the plurality of conductive patterns in a plan view on the side on which the counter substrate is located so as to correspond to the insulation film in the peripheral region and to which a potential different from the common potential is applied. An alignment film which is formed on the side on which the counter substrate may be located so as to correspond to the peripheral electrodes.

In the liquid crystal device according to the aspect of the disclosure, the peripheral electrodes to which the potential different from the common potential is applied are formed in the peripheral region of the element substrate. Therefore, an electric field is generated in the thickness direction of the liquid crystal layer between the peripheral electrodes and the common electrode. Accordingly, even when the ionic impurities mixed at the time of injecting the liquid crystal or the ionic impurities eluted from the sealing member are present in the liquid crystal layer and the ionic impurities cohere at the end of the image display region with the driving of the liquid crystal, the ionic impurities can be drawn toward the peripheral electrodes in the peripheral region or the portions of the common electrode facing the peripheral electrodes and the drawn ionic impurities remain in the peripheral region in the cohering state. Therefore, since the ionic impurities are not eluded to the image display region, it is possible to prevent the display quality from deteriorating due to the ionic impurities. Here, the conductive patterns are formed in the peripheral region in order to reduce a difference in the height between the image display region and the peripheral region and to improve flatness of the surface insulation film in the image display region. In the aspect of the disclosure, the peripheral electrodes for trapping the ionic impurities are formed at the positions overlapping the conductive patterns. Therefore, even when the conductive patterns are formed, the peripheral electrodes can be formed at the positions at which a distance from the image display region is appropriate. Accordingly, it is possible to prevent the ionic impurities trapped in the peripheral electrodes from having an influence on the image display region. Further, it is possible to reliably draw the ionic impurities, which are likely to cohere in the image display region, to the peripheral electrodes. Thus, it is possible to simultaneously realize the flatness in the image display region and prevent the display quality from deteriorating due to the ionic impurities.

According to an aspect of the disclosure, in the peripheral region, a peripheral circuit section including a peripheral circuit and signal wirings may be formed in a region overlapping the plurality of conductive patterns in a plan view on a side opposite to the side on which the counter substrate is located. With such a configuration, the electric influence of the peripheral electrodes for trapping the ionic impurities can be blocked by the conductive patterns even when an alternate-current potential is applied to the peripheral electrodes. Therefore, the peripheral circuit section can be formed in the regions overlapping the conductive patterns, that is, the regions overlapping the peripheral electrodes.

According to an aspect of the disclosure, the peripheral electrodes may be formed of a plurality of strip-shaped electrodes extending in parallel along regions overlapping the plurality of conductive patterns in at least a region overlapping the peripheral circuit section in a plan view. With such a configuration, a portion exceeding the conductive pattern can be restricted to be small in the peripheral electrode. Therefore, even when the alternate-current potential is applied to the peripheral electrodes, the electric influence of the peripheral electrodes for trapping the ionic impurities is blocked by the conductive patterns, and thus rarely reaches the peripheral circuit section.

According to an aspect of the disclosure, a pitch of the plurality of strip-shaped electrodes may be equal to a pitch of the plurality of conductive patterns in a direction perpendicular to the extension direction of the plurality of strip-shaped electrodes. With such a configuration, the portion exceeding the conductive pattern can be restricted to be small in the peripheral electrode. Therefore, even when the alternate-current potential is applied to the peripheral electrodes, the electric influence of the peripheral electrodes for trapping the ionic impurities is blocked by the conductive patterns, and thus rarely reaches the peripheral circuit section.

According to an aspect of the disclosure, a line width of the plurality of strip-shaped electrodes may be smaller than a dimension of the plurality of conductive patterns in a direction perpendicular to the extension direction of the plurality of strip-shaped electrodes. With such a configuration, the portion exceeding the conductive pattern can be restricted to be small in the peripheral electrode. Therefore, the electric influence of the peripheral electrodes for trapping the ionic impurities is blocked by the conductive patterns, and thus rarely reaches the peripheral circuit section.

According to an aspect of the disclosure, the plurality of conductive patterns and the peripheral electrodes may be formed in the entire circumference of the peripheral region. With such a configuration, since the formation range of the peripheral electrodes is broad, it is possible to efficiently trap the ionic impurities.

According to an aspect of the disclosure, the alignment film is an inorganic alignment film. Effectiveness can be realized when a nematic liquid crystal compound in which dielectric anisotropy (dielectric constant anisotropy) is negative is used in the liquid crystal layer. The inorganic alignment film tends to adsorb the ionic impurities with ease. According to an aspect of the disclosure, even when the inorganic alignment film is used, it is possible to reliably prevent the ionic impurities from cohering in the image display region. Further, when the nematic liquid crystal compound in which dielectric anisotropy is negative is used in the liquid crystal layer, the liquid crystal molecule rotates about one portion in the longitudinal direction. Therefore, an image easily deteriorates as the ionic impurities easily gather at a specific portion. In this embodiment, however, even when the nematic liquid crystal compound in which dielectric anisotropy is negative is used in the liquid crystal layer, it is possible to reliably prevent the ionic impurities from cohering in the image display region.

The liquid crystal device according to the aspect of the disclosure is used as, for example, a direct-view display device or a light valve of a projection-type display apparatus. When the liquid crystal device according to the aspect of the disclosure is used in the projection-type display apparatus, the projection-type display apparatus includes a light source unit which radiates the liquid crystal device with light and a projection optical system which projects the light modulated by the liquid crystal device.

BRIEF DESCRIPTION OF THE DRAWINGS

Non-limiting and non-exhaustive embodiments of the present disclosure will be described with reference to the accompanying drawings, wherein like numbers reference like elements.

FIGS. 2A and 2B are diagrams illustrating a liquid crystal panel of the liquid crystal device according to the disclosure.

FIGS. 3A and 3B are diagrams illustrating electrodes and the like formed on an element substrate of the liquid crystal device according to the disclosure.

FIGS. 7A and 7B are diagrams illustrating the peripheral electrodes formed in the element substrate of the liquid crystal device according to a second embodiment of the disclosure.

FIGS. 8A and 8B are expanded diagrams illustrating the peripheral electrodes formed in the element substrate of the liquid crystal device according to a modified example of the second embodiment of the disclosure.

DESCRIPTION OF EXEMPLARY EMBODIMENTS

Figure 1:
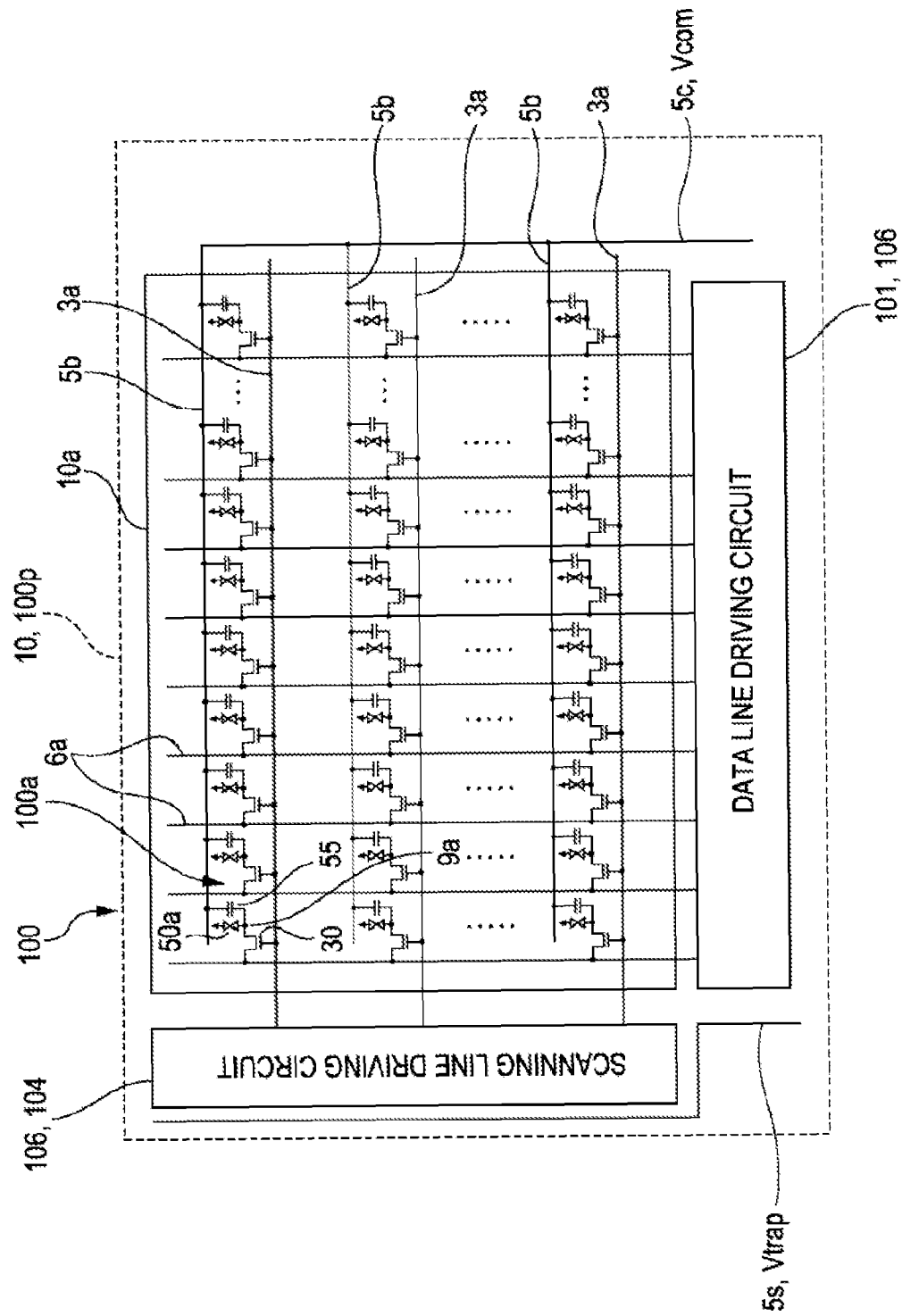
FIG. 1 is a block diagram illustrating the electric configuration of a liquid crystal device according to the disclosure.

Hereinafter, embodiments of the disclosure will be described with reference to the accompanying drawings. It is to be understood, however, that other embodiments may be utilized and changes may be made without departing from the scope of the present disclosure. Therefore, the following detailed description is not to be taken in a limiting sense, and the scope of the present disclosure is defined by the appended claims and their equivalents. In the drawings referred to in the following description, each layer or each member is illustrated with different scales so as to recognize each layer and each member in the drawings. Further, when the direction of a current flowing an electric-field effect type transistor is reversed, the source and the drain are changed. However, in the following description, a drain is connected to a pixel electrode and a source is connected to a data line to facilitate the description. Furthermore, when layers formed in an element substrate are described, an upper side or a surface side means a side (side on which a counter substrate is located) opposite to a side on which a substrate body of the element substrate is located and a lower side means a side (side opposite to a side on which the counter substrate is located) on which the substrate body of the element substrate is located.

First Embodiment

General Configuration

FIG. 1 is a block diagram illustrating the electric configuration of a liquid crystal device according to the disclosure. In FIG. 1, a liquid crystal device 100 includes a TN (Twisted Nematic) mode or VA (Vertical Alignment) mode liquid crystal panel 100p. The liquid crystal panel 100p includes an image display region 10a, in which a plurality of pixels 100a is arranged in a matrix form, in the middle region thereof. In an element substrate 10 (for example, see FIGS. 2A and 2B) of the liquid crystal panel 100p, as described below, a plurality of data lines 6a and a plurality of scanning lines 3a extend horizontally and vertically inside the image display region 10a and pixels 100a are formed at intersection positions of the data lines 6a and the scanning lines 3a. A pixel transistor 30 formed as an electric-field effect type transistor and a pixel electrode 9a described below are formed in each of the plurality of pixels 100a. The data line 6a is electrically connected to the source of the pixel transistor 30, the scanning line 3a is electrically connected to the gate of the pixel transistor 30, and the pixel electrode 9a is electrically connected to the drain of the pixel transistor 30.

In the element substrate 10, scanning line driving circuits 104, a data line driving circuit 101, and a peripheral circuit section 106 including various wirings are installed further on the outside of the image display region 10a. The data line driving circuit 101 is electrically connected to the data lines 6a so as to sequentially supply the data lines 6a with an image signal supplied from an image processing circuit. The scanning line driving circuits 104 are electrically connected to the scanning lines 3a so as to sequentially supply the scanning lines 3a with a scanning signal.

In each pixel 100a, the pixel electrode 9a faces a common electrode formed in a counter substrate 20 (for example, see FIGS. 2A and 2B) described below with a liquid crystal layer interposed therebetween so as to form a liquid crystal capacitor 50a. Each pixel 100a further includes an accumulation capacitor 55 formed in parallel to the liquid crystal capacitor 50a in order to prevent a variation in the image signal held in the liquid crystal capacitor 50a. In this embodiment, each capacitor line 5b extends in parallel to each scanning line 3a through the plurality of pixels 100a so as to form the accumulation capacitors 55.

In the liquid crystal device 100, a common potential line 5c to which a common potential Vcom is applied and a wiring 5s which supplies an ionic impurity trapping potential Vtrap different from the common potential Vcom are formed in the regions, where the scanning line driving circuits 104 and the data line driving circuit 101 are formed, or in the vicinity of these regions. Accordingly, the accumulation capacitors 55 are electrically connected to the common potential line 5c and peripheral electrodes described below are electrically connected to the wiring 5s.

Configurations of Liquid Crystal Panel 100p and Element Substrate 10

FIGS. 2A and 2B are diagrams illustrating the liquid crystal panel 100p of the liquid crystal device 100 according to the disclosure. FIG. 2A is a plan view illustrating the liquid crystal panel 100p of the liquid crystal device 100 according to the disclosure when the liquid crystal panel 100p and constituent elements are viewed from the side of a counter substrate. FIG. 2B is a sectional view taken along the line IIB-IIB. FIGS. 3A and 3B are diagrams illustrating electrodes formed in the element substrate 10 of the liquid crystal device 100 according to the disclosure. FIG. 3A is a diagram illustrating the layout of pixel electrodes 9a and dummy pixel electrodes 9b across the element substrate 10. FIG. 3B is a diagram illustrating the shapes or the like of the dummy pixel electrodes 9b. In FIGS. 3A and 3B, the peripheral electrodes 8a are not illustrated. Further, in FIGS. 3A and 3B, the number of illustrated pixel electrodes 9a and the number of illustrated dummy pixel electrodes 9b are small and the width size of a peripheral region 10b is the size of three dummy pixel electrodes.

In the liquid crystal panel 100p, as shown in FIGS. 2A, 2B, and 3A, the element substrate 10 and the counter substrate 20 are bonded by a sealing member 107 with a predetermined gap therebetween. The sealing member 107 is formed in a frame shape along the outer edge of the counter substrate 20. The sealing member 107 is an adhesive made of a light-curing resin or a thermal curing resin and fiberglass, glass beads, or the like are mixed so as to maintain a predetermined distance between the element substrate and the counter substrate. In this embodiment, a discontinuous portion 107a used as a liquid crystal injection port is formed in the sealing member 107. The discontinuous portion 107a is sealed by a sealing substance 105 after liquid crystal is injected. In this embodiment, the discontinuous portion 107a and the sealing substance 105 are formed on a side portion 10d among four side portions 10d to 10g of the element substrate 10.

In the liquid crystal panel 100p with the above-described configuration, both the element substrate 10 and the counter substrate 20 are rectangular. In the substantially middle portion of the liquid crystal panel 100p, the image display region 10a described with reference to FIG. 1 is formed in a rectangular shape. The sealing member 107 is also formed in a substantially rectangular shape so as to correspond to the rectangular shape of the image display region 10a. The substantially rectangular peripheral region 10b is formed in a frame shape between the inner edge of the sealing member 107 and the outer edge of the image display region 10a.

On one surface 10s (surface on which the counter substrate 20 is located) between the one surface 10s and the other surface 10t of the element substrate 10, the data line driving circuit 101 and a plurality of terminals 102 are formed outside the image display region 10a along one side (the side portion 10d) of the element substrate 10 and the scanning line driving circuits 104 are formed along the other sides (the side portions 10e and 10g) adjacent to the one side. On the one surface 10s of the element substrate 10, as described in detail below, the pixel transistors 30 and the rectangular pixel electrodes 9a electrically connected to the pixel transistors 30 described with reference to FIG. 1 are formed in a matrix form in the image formation region 10a. An alignment film 16 is formed on the upper layer of the pixel electrodes 9a.

On the one surface 10s of the element substrate 10, the dummy pixel electrodes 9b simultaneously formed with the pixel electrodes 9a are formed as a conductive pattern in the peripheral region 10b. The dummy pixel electrodes 9b have a configuration in which a potential is applied or a configuration of a floating state where no potential is applied. In either case, the dummy pixel electrodes 9b contribute in a case where the formation surface of the alignment film 16 is formed as a flattened surface by condensing the positions of the heights of the image display region 10a and the peripheral region 10b when the formation surface of the alignment film 16 is flattened by polishing in the element substrate 10. In this embodiment, since the common potential Vcom is applied to the dummy pixel electrodes 9b via the common potential line 5c, it is possible to prevent disarray of the alignment of liquid crystal molecules in the end portions of the outer circumference of the image display region 10a.

In this embodiment, as shown in FIG. 3B, the dummy pixel electrodes 9b are formed so as to have the same shape and the same size as those of the pixel electrodes 9a at the same pitch as those of the pixel electrodes 9a. Here, the dummy pixel electrodes 9b adjacent to each other among the dummy pixel electrodes 9b are connected to each other via a connection portion 9u with a width narrower than that of the dummy pixel electrode 9b. Accordingly, when the common potential Vcom is applied to some of the dummy pixel electrodes 9b, the common potential Vcom is applied to all of the dummy pixel electrodes 9b.

Referring back to FIG. 2B, a common electrode 21 is formed on one surface facing the element substrate 10 between both the surfaces of the counter substrate 20 and an alignment film 26 is formed in the upper layer of the common electrode 21. The common electrode 21 is formed on substantially the entire surface of the counter substrate 20 or is formed as a plurality of strip-shaped electrodes across the plurality of pixels 100a. Further, on the one surface of the counter substrate 20 facing the element substrate 10, a light-shielding layer 108 is formed in the lower layer of the common electrode 21. In this embodiment, the light-shielding layer 108 is formed in a frame shape extending along the outer edge of the image display region 10a. Here, since the outer edge of the light-shielding layer 108 is located at a position spaced from the inner edge of the sealing member 107, the light-shielding layer 108 and the sealing member 107 do not overlap each other. In the counter substrate 20, the light-shielding layer 108 may be formed as a black matrix portion at the regions or the like overlapping regions sandwiched by the adjacent pixel electrodes 9a.

In the liquid crystal panel 100p with the above-described configuration, inter-substrate conducting electrodes 109 electrically conducting the element substrate 10 and the counter substrate 20 are formed at the regions of the element substrate 10 overlapping the counter substrate 20 outside the sealing member 107. Each inter-substrate conducting electrode 109 is electrically connected to the common potential line 5c. Since inter-substrate conducting members 109a including conductive particles such as so-called silver points are disposed at the positions overlapping the inter-substrate conducting electrodes 109, the common potential line 5c of the element substrate 10 and the common electrode 21 of the counter substrate 20 are electrically connected to each other via the inter-substrate conducting members 109a. Accordingly, the common potential Vcom is applied to the common electrode 21 from the side of the element substrate 10.

Here, the sealing member 107 with the substantially identical width size is installed along the outer edge of the counter substrate 20. Therefore, the sealing member 107 is substantially rectangular. However, since the sealing member 107 is disposed so as to avoid the inter-substrate conducting electrodes 109 and pass the inside at the regions overlapping the corners of the counter substrate 20, the corners of the sealing member 107 have a substantially circular arc shape.

The liquid crystal device 100 with the above-described configuration can be configured as a transmissive liquid crystal device, when each pixel electrode 9a and the common electrode 21 are formed of a light-transmission conductive film such as an ITO (Indium Tin Oxide) film or an IZO (Indium Zinc Oxide) film. On the other hand, when one of each pixel electrode 9a and the common electrode 21 is formed by a light-transmission conductive film and the other thereof is formed of a reflection-type conductive film such as an aluminum film, a reflective liquid crystal device can be configured. When the liquid crystal device 100 is configured as the reflective liquid crystal device, light incident from one of the element substrate 10 and the counter substrate 20 is modulated to display an image while the light is reflected from the other substrate and exits. When the liquid crystal device 100 is configured as a transmissive liquid crystal device, light incident from one of the element substrate 10 and the counter substrate 20 is modulated to display an image while the light passes through the other substrate and exits.

The liquid crystal device 100 can be used as a color display device of an electronic apparatus such as a mobile computer or a mobile telephone. When the crystal device 100 can be used as a color display device, a color filter (not shown) or a protective film is formed in the counter substrate 20. In the liquid crystal device 100, a polarizing film, a phase difference film, a polarizing plate, or the like is disposed in a predetermined direction in the liquid crystal panel 100p in accordance with the kinds of the liquid crystal layer 50 to be used or in accordance with each of a normally white mode and a normally black mode. Further, the liquid crystal device 100 can be used as a light valve for RGB in a projection-type display apparatus (liquid crystal projector) described below. In this case, since each color light separated through a dichroic mirror for RGB color separation is incident as projection light on each liquid crystal device 100 for RGB, no color filter is formed.

In this embodiment, a case will mainly be described in which the liquid crystal device 100 is configured as a transmissive liquid crystal device used as a light valve for RGB in a projection-type display apparatus described below and light incident from the counter substrate 20 passes through the element substrate 10 and exits. Further, in this embodiment, a case will be described in which the liquid crystal device 100 includes the VA mode liquid crystal panel 100p in which a nematic liquid crystal compound in which dielectric anisotropy (dielectric constant anisotropy) is negative as the liquid crystal layer 50.

Specific Configuration of Pixel

Figure 4A:
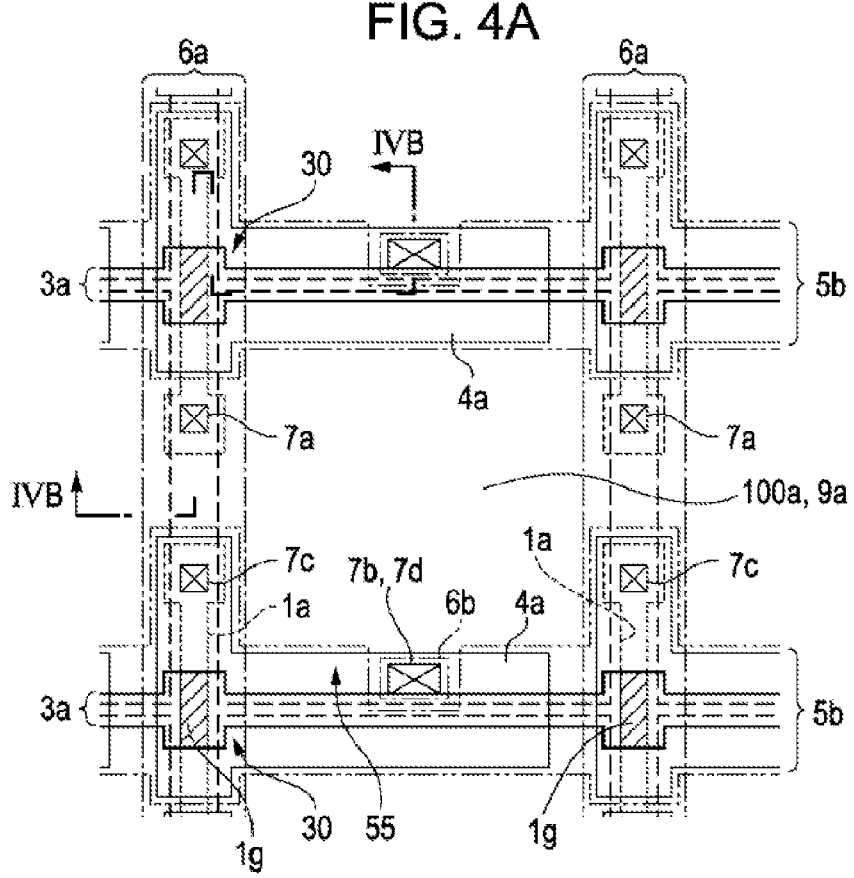
FIGS. 4A and 4B are diagrams illustrating pixels of the liquid crystal device according to the disclosure.
Figure 4B:
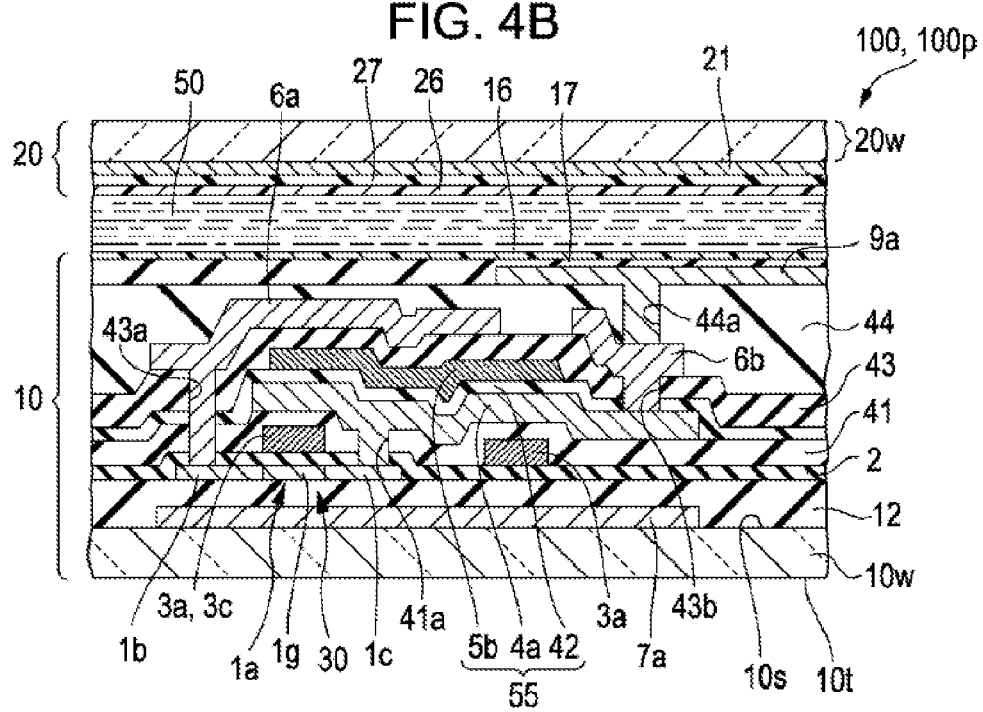

FIGS. 4A and 4B are diagrams illustrating pixels of the liquid crystal device 100 according to the disclosure.

FIG. 4A is a plan view illustrating the pixels adjacent to each other in the element substrate 10 of the liquid crystal device 100 according to the disclosure and FIG. 4B is a sectional view illustrating the liquid crystal device 100 taken along the line IVB-IVB of FIG. 4A. In FIG. 4A, a semiconductor layer is indicated by a narrow short dotted line, the scanning line 3a is indicated by a thick solid line, and the data line 6a and a thin film formed simultaneously with the data line 6a are indicated by a one-dot chain line. The capacitor line 5b is indicated by a two-dot chain line, the pixel electrode 9a is indicated by a thick long dotted line, and a drain electrode 4a described below is indicated by a narrow solid line. Further, a light-shielding layer 7a is formed at a region at which the scanning line 3a, the capacitor line 5b, and the like overlap each other. In FIG. 4A, however, the light-shielding layer 7a is not illustrated.

As shown in FIG. 4A, on one surface 10s of the element substrate 10, the rectangular pixel electrode 9a is formed in each of the plurality of pixels 100a. The data lines 6a and the scanning lines 3a are formed along the vertical and horizontal boundaries of the pixel electrodes 9a. The data lines 6a and the scanning lines 3a extend in a straight line and the pixel transistors 30 are formed so as to correspond at the intersections between the data lines 6a and the scanning lines 3a. The capacitor lines 5b are formed on the element substrate 10 so as to overlap the scanning lines 3a. In this embodiment, the capacitor line 5b includes a main line portion extending in a straight line so as to overlap the scanning line 3a and a sub-line portion extending so as to overlap the data line 6a at the intersection between the data line 6a and the scanning line 3a.

As shown in FIGS. 4A and 4B, the element substrate 10 mainly includes the pixel electrodes 9a formed on the one surface 10s of a light-transmission substrate body 10w such as a quartz substrate or a glass substrate, the pixel transistors 30 for pixel switching, and the alignment film 16. The counter substrate 20 mainly includes the common electrode 21 formed on one surface of a light-transmission substrate body 20w such as a quartz substrate or a glass substrate and the alignment film 26.

In the element substrate 10, a light-shielding layer 7a formed of a metallic silicide film or a metallic film is formed on the one surface 10s of the substrate body 10w and an underlying insulation film 12 is formed on the surface of the light-shielding layer 7a. Further, the pixel transistor 30 including a semiconductor layer 1a is formed in each of the plurality of pixels 100a. The semiconductor layer 1a includes a channel region 1g facing a gate electrode 3c, which is formed of a part of the scanning line 3a with a gate insulation layer 2 interposed therebetween, a source region 1b, and a drain region 1c. The source region 1b and the drain region 1c include a low-concentration region and a high-concentration region. For example, the semiconductor layer 1a is formed of a polycrystalline silicon film or the like formed on the surface of the underlying insulation film 12 and the gate insulation layer 2 is formed of a silicon oxide film or a silicon nitride film formed by a CVD method or the like. Further, the gate insulation layer 2 may have a two-layered structure which has a silicon oxide film formed by thermally oxidizing the semiconductor layer 1a and a silicon oxide film or a silicon nitride film formed by a CVD method or the like in some cases. A conductive polysilicon film, a metallic silicide film, or a metallic film is used in the scanning line 3a. In this embodiment, the light-shielding layer 7a is formed at the region overlapping the pixel transistor 30 in order to prevent an erroneous operation caused due to photocurrent in the pixel transistor 30 when light passing through the liquid crystal device 100 is reflected from another member and the reflected light is incident on the semiconductor layer 1a. However, the light-shielding layer 7a may be formed as the scanning line and may be electrically connected to the gate electrode 3c and the light-shielding layer 7a with a contact hole interposed therebetween.

A first inter-layer insulation film 41 formed of a silicon oxide film or the like is formed on the upper layer of the scanning line 3a and a drain electrode 4a is formed on the upper layer of the first inter-layer insulation film 41. The drain electrode 4a is formed in a substantially L shape extending along the scanning line 3a and the data line 6a by using the position of the intersection between the scanning line 3a and the data line 6a as a base point. The drain electrode 4a is formed of a conductive polysilicon film, a metallic silicide film, a metallic film, or the like and is electrically connected to the drain region 1c via the contact hole 41a.

A dielectric layer 42 formed of a silicon nitride film, a silicon oxide film, or the like is formed on the upper layer of the drain electrode 4a. The capacitor line 5b is formed on the upper layer of the dielectric layer 42 so as to face the drain electrode 4a with the dielectric layer 42 interposed therebetween. The capacitor line 5b, the dielectric layer 42, and the drain electrode 4a form the accumulation capacitor 55. The capacitor line 5b is formed of a conductive polysilicon film, a metallic silicide film, a metallic film, or the like.

A second inter-layer insulation film 43 formed of a silicon oxide film or the like is formed on the upper layer of the capacitor line 5b. The data line 6a and a relay electrode 6b are formed on the upper layer of the second inter-layer insulation film 43. The data line 6a is electrically connected to the source region 1b via a contact hole 43a. The relay electrode 6b is electrically connected to the drain electrode 4a via a contact hole 43b and is electrically connected to the drain region 1c with the drain electrode 4a interposed therebetween. The data line 6a and the relay electrode 6b are formed of a conductive polysilicon film, a metallic silicide film, a metallic film, or the like.

A third inter-layer insulation film 44 formed of a silicon oxide film or the like is formed on the upper layer of the data line 6a and the relay electrode 6b. A contact hole 44a leading to the relay electrode 6b is formed in the third inter-layer insulation film 44. Since the pixel electrode 9a formed of a light-transmission conductive film such as an ITO film is formed on the upper layer of the third inter-layer insulation film 44, the pixel electrode 9a is electrically connected to the relay electrode 6b via the contact hole 44a. In this embodiment, the surface of the third inter-layer insulation film 44 is formed as a flattened surface.

Here, the dummy pixel electrodes 9b (not shown in FIGS. 4A and 4B) described with reference to FIG. 2B and FIG. 3A are formed on the surface of the third inter-layer insulation film 44. The dummy pixel electrode 9b is formed of a light-transmission conductive film formed simultaneously with the pixel electrode 9a.

The alignment film 16 is formed on the surface of the pixel electrode 9a. The alignment film 16 is formed of a resin film such as polyimide or an oblique evaporation film such as a silicon oxide film. In this embodiment, the alignment film 16 is an inorganic alignment film (vertical alignment film) formed of an oblique evaporation film such as $SiO_X$ (where X<2), $SiO_2$, $TiO_2$, $MgO$, $Al_2O_2$, $In_2O_2$, $Sb_2O_2$, or $Ta_2O_5$. A surface insulation film 17 such as a silicon oxide film or a silicon nitride film is formed between the layers of the alignment film 16 and the pixel electrode 9a.

The surface insulation film 17 is flattened in its surface and fills concave portions formed between the pixel electrodes 9a. Accordingly, the alignment film 16 is formed on the flattened surface of the surface insulation film 17. Such a configuration can be realized by polishing the surface of the surface insulation film 17 after the surface insulation film 17 is formed on the surface of the pixel electrodes 9a.

Chemical mechanical polishing can be used as the polishing and the smoothly polished surface can be obtained at high speed through actions of chemical components included in a polishing agent and movement relative to the element substrate 10. More specifically, a polishing apparatus performs the polishing while relatively rotating a surface plate attached with a polishing cloth (pad) formed of an unwoven cloth, foamed polyurethane, porous fluorine resin, or the like and a holder holding the element substrate 10. At this time, for example, a polishing agent including cerium oxide particles with an average grain diameter of 0.01 μm to 20 μm, acrylic acid ester derivative as a dispersing agent, and water is supplied between the polishing cloth and the element substrate 10. At this time, when there is a difference in the height between the image display region 10a and the peripheral region 10b, it is difficult to form the inside of the image display 10a as a flattened surface even through the polishing process. In this embodiment, however, the dummy pixel electrodes 9b are formed in the peripheral region 10b, as described with reference FIGS. 2A and 2B and FIGS. 3A and 3B. Accordingly, there is no difference in height between the image display region 10a and the peripheral region 10b when the surface insulation film 17 is formed. Therefore, the inside of the image display region 10a can be formed as a flattened surface through the polishing process.

In the counter substrate 20, the common electrode 21 is formed on one surface of the light-transmission substrate body 20w such as a quartz substrate or a glass substrate and the alignment film 26 is formed so as to cover the common electrode 21. Like the alignment film 16, the alignment film 26 is formed of a resin film such as polyimide or an oblique evaporation film such as a silicon oxide film. In this embodiment, the alignment film 26 is an inorganic alignment film (vertical alignment film) formed of an oblique evaporation film such as $SiO_X$ (where X<2), $SiO_2$, $TiO_2$, MgO, $Al_2O_3$, $In_2O_3$, $Sb_2O_3$, or $Ta_2O_5$. A surface insulation film 27 such as a silicon oxide film or a silicon nitride film is formed between the layers of the alignment film 26 and the common electrode 21. The surface of the protective film 27 is formed as a flattened surface and the alignment film 26 is formed on the flattened surface. In the alignment films 16 and 26, a nematic liquid crystal compound in which the dielectric anisotropy used in the liquid crystal layer 50 is negative is vertically aligned, so that the liquid crystal panel 100p operates in a normally black VA mode.

Configuration of Peripheral Circuit Section

Figure 5:
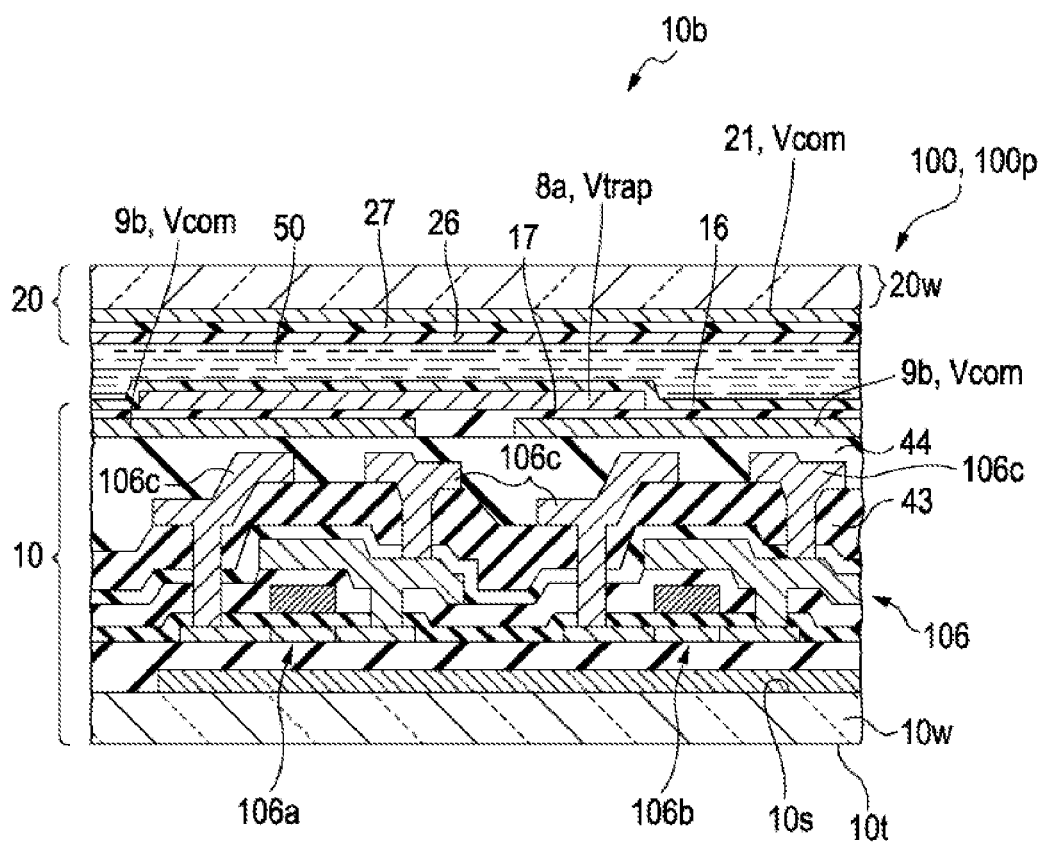
FIG. 5 is a diagram illustrating a peripheral circuit section and the like of the liquid crystal device according to the disclosure.

FIG. 5 is a diagram illustrating a peripheral circuit section 106 and the like of the liquid crystal device 100 according to the disclosure. In the liquid crystal device 100, as shown in FIG. 5, a complementary transistor circuit or the like including n-channel type driving transistors 106a and p-channel type driving transistors 106b is configured in the peripheral circuit section 106 of the data line driving circuit 101, the scanning line driving circuit 104, and the like described with reference to FIG. 1 and FIGS. 2A and 2B. Various wirings 106c and the like are formed in the peripheral circuit section 106. Here, since the driving transistors 106a and 106b are formed in some steps of a process of manufacturing the pixel transistors 30, the regions at which the data line driving circuit 101 and the scanning line driving circuit 104 are formed in the element substrate 10 also have substantially the same cross-sectional configuration as the cross-sectional configuration shown in FIG. 3B.

In the region at which the peripheral circuit section 106 is formed, in this embodiment, each dummy pixel electrode 9b formed of the conductive film at the same layer as that of the pixel electrode 9a is formed on the surface of the third inter-layer insulation film 44 covering the peripheral circuit section 106 in the peripheral region 10b sandwiched between the image display region 10a and the sealing member 107. In the peripheral region 10b, the dummy pixel electrodes 9b are electrically connected to the common potential line 5c shown in FIGS. 1, 2A, and 3A in an empty region or the like of the peripheral circuit section 106. When the dummy pixel electrodes 9b and the common potential line 5c are electrically connected to each other, contact holes (not shown) formed in the third inter-layer insulation film 44 or the like are used.

In the element substrate 10, the peripheral electrodes 8a for trapping ionic impurities are formed on the surface of the surface insulation film 17 in the peripheral region 10b. In the peripheral region 10b, each peripheral electrode 8a is electrically connected to the wiring 5s shown in FIGS. 1, 2A, and 3A in the empty region or the like of the peripheral circuit section 106 and the dummy pixel electrode 9b. When each peripheral electrode 8a and the wiring 5s are electrically connected to each other, a contact hole (not shown) formed in the third inter-layer insulation film 44 or the like is used.

Detailed Configuration of Peripheral Electrode 8a

Figure 6A:
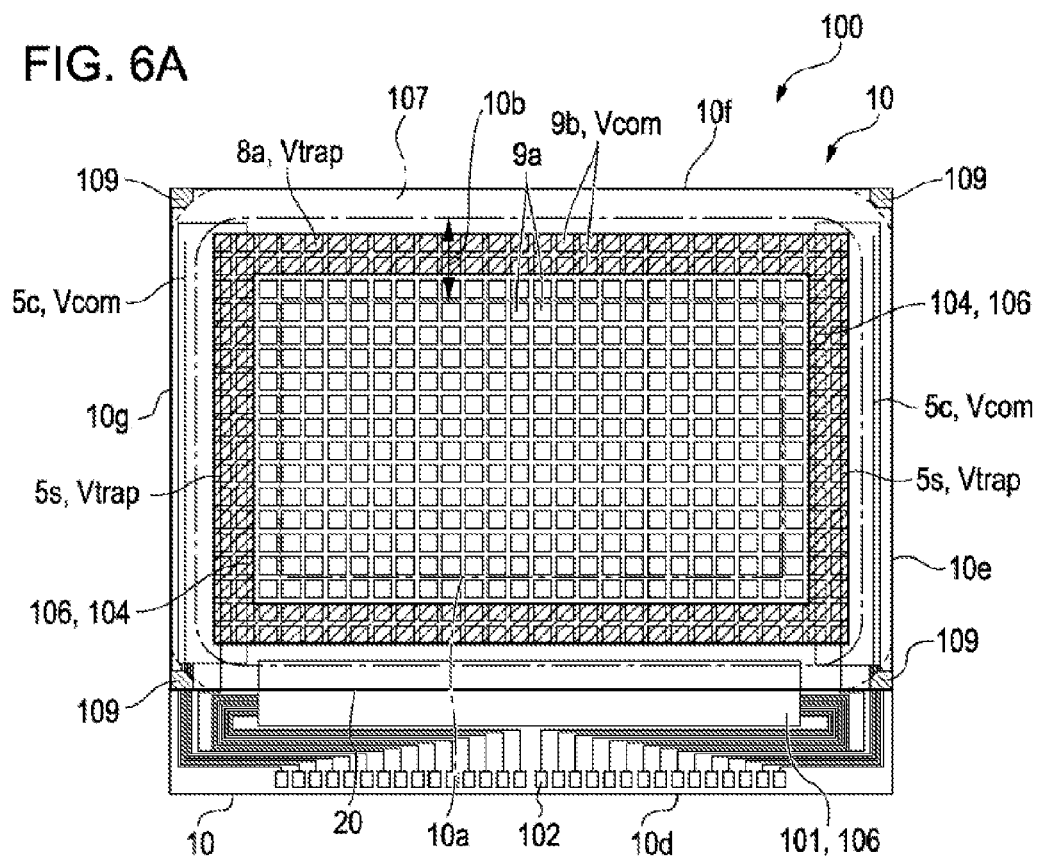
FIGS. 6A and 6B are diagrams illustrating the peripheral electrodes formed in the element substrate of the liquid crystal device according to a first embodiment of the disclosure.
Figure 6B:
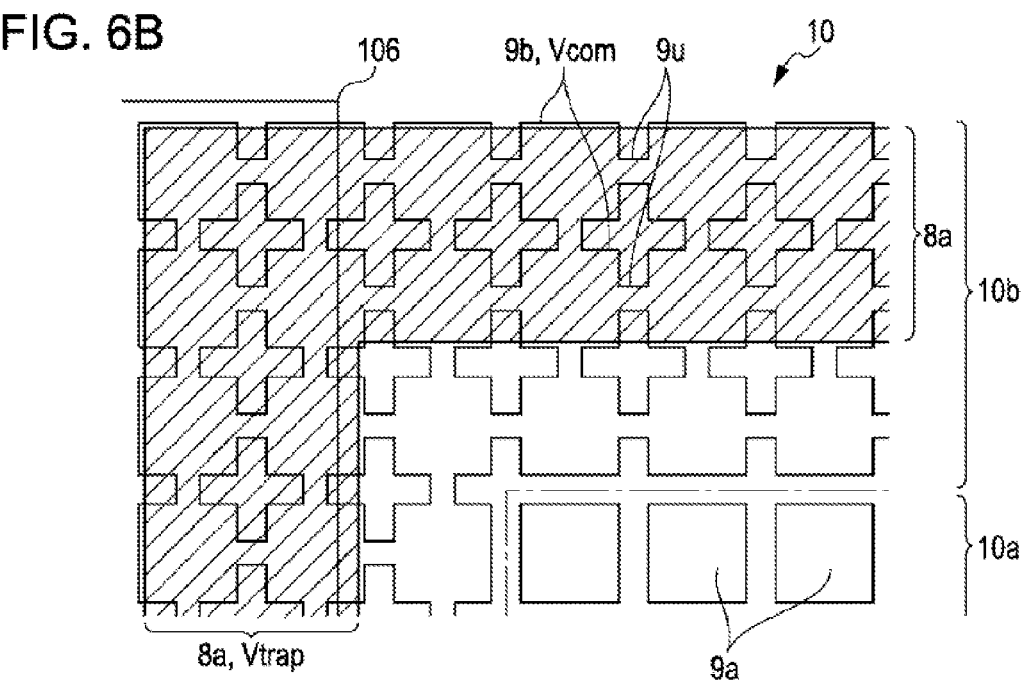

FIGS. 6A and 6B are diagrams illustrating the peripheral electrodes 8a formed in the element substrate 10 of the liquid crystal device 100 according to the first embodiment of the disclosure. FIG. 6A is a diagram illustrating the layout of all the peripheral electrodes 8a and FIG. 6B is an expanded diagram illustrating the peripheral electrodes 8a. Further, in FIGS. 6A and 6B, the number of illustrated pixel electrodes 9a and the number of illustrated dummy pixel electrodes 9b are small. In FIGS. 6A and 6B, the width size of the peripheral region 10b is the size of three dummy pixel electrodes.

In the element substrate 10 of the liquid crystal device 100 according to this embodiment, as shown in FIG. 5 and FIGS. 6A and 6B, a part of the peripheral circuit section 106 is formed in the peripheral region 10b sandwiched between the image display region 10a and the sealing member 107. In the peripheral region 10b, the dummy pixel electrodes 9b are formed in the regions overlapping the peripheral circuit section 106 on the side of the upper layer. Further, in the element substrate 10 of the liquid crystal device 100 according to this embodiment, each peripheral electrode 8a for trapping ionic impurities is formed in the region overlapping the dummy pixel electrode 9b on the side of the upper layer in the peripheral region 10b. In this embodiment, the peripheral electrode 8a is formed of a conductive metallic oxide film such as ITO or IZO, a conductive polysilicon film, a metallic silicide film, a metallic film, or the like.

In the peripheral region 10b, the peripheral electrodes 8a are electrically connected to the wiring 5s shown in FIGS. 1, 2A, and 3A in the empty regions or the like of the peripheral circuit section 106 and the dummy pixel electrode 9b, the ionic impurity trapping potential Vtrap is applied. When the peripheral electrodes 8a and the wiring 5s are electrically connected to each other, contact holes (not shown) formed in the third inter-layer insulation film 44 or the like are used.

In this embodiment, the peripheral electrodes 8a are formed in a rectangular frame shape surrounding the entire circumference of the image display region 10a in the peripheral region 10b. Here, the peripheral electrodes 8a are not formed at the positions adjacent to the image display region 10a in the width direction of the peripheral region 10b, but are formed only at the position spaced from the image display region 10a in the peripheral region 10b. Therefore, when the peripheral electrodes 8a are formed on the surface of the surface insulation film 17 and the alignment film 16 is then formed, the alignment film 16 can appropriately be formed in the image display region 10a in spite of the fact that a formation condition of the alignment film 16 is not optimum due to a stepped difference caused by the peripheral electrodes 8a in the region at which the peripheral electrodes 8a are formed. Further, even when the ionic impurity trapping potential Vtrap is applied to the peripheral electrodes 8a, the alignment of the liquid crystal molecules at the image display region 10a is rarely disarrayed.

In the liquid crystal device 100 according to this embodiment, the constant common potential Vcom of 0 V is applied to the common electrode 21 and the dummy pixel electrodes 9b and the polarity of the potential applied to the pixel electrodes 9a is reversed. Further, the polarity of the potential applied to the peripheral electrodes 8a is reversed. For example, the polarity of the potential Vtrap applied to the peripheral electrodes 8a is reversed at the same timing as the timing at which the polarity of the potential applied to the pixel electrodes 9a is reversed. Further, the polarity of the potential Vtrap applied to the peripheral electrodes 8a may be reversed at a frequency higher in the timing at which the polarity of the potential applied to the pixel electrodes 9a is reversed. Although any driving method may be used, the potential Vtrap applied to the peripheral electrodes 8a is normally different from the common potential Vcom (0 V)

applied to the common electrode 21 and the dummy pixel electrodes 9b. Accordingly, even when ionic impurities mixed at the time of injecting the liquid crystal in the manufacturing of the liquid crystal device 100 or ionic impurities eluted from the sealing member 107 are present in the liquid crystal layer 50, an electric field is generated in the thickness direction of the liquid crystal layer 50 between the peripheral electrodes 8a and the common electrode 21 at the time of applying the potential Vtrap to the peripheral electrodes 8a. Therefore, even when the ionic impurities mixed at the time of injecting the liquid crystal or the ionic impurities eluted from the sealing member 107 are present in the liquid crystal layer 50, the ionic impurities can be drawn efficiently and thus remain in the portions facing the peripheral electrodes 8a in the peripheral electrodes 8a and the common electrode 21. Accordingly, the ionic impurities do not cohere in the image display region 10a.

Accordingly, when the liquid crystal device 100 is manufactured, and then the ionic impurity trapping potential Vtrap is applied to the peripheral electrodes 8a and the common potential Vcom is applied to the common electrode 21 at the time of inspecting the liquid crystal device 100, the ionic impurities can be drawn toward the positions of the peripheral electrodes 8a and can be made to remain in the positions thereof. Further, even when the postures of the liquid crystal molecules used in the liquid crystal layer 50 are completely changed in a displaying process of the liquid crystal device 100 and the ionic impurities in the liquid crystal layer 50 attempt to cohere in each portion of the image display region 10a due to the minute fluctuation of the liquid crystal molecules, the ionic impurities can be drawn toward the positions of the peripheral electrodes 8a. Therefore, since the ionic impurities remain in a cohering state, the ionic impurities do not cohere in the image display region 10a. In particular, when direct-current components are unbalanced at the reversal driving of the liquid crystal device 100, the ionic impurities in the liquid crystal layer 50 easily cohere in each portion of the image display region 10a. In this embodiment, however, since the ionic impurities can be drawn toward the positions of the peripheral electrodes 8a and can thus remain in the cohering state, the ionic impurities do not cohere in the image display region 10a. Accordingly, it is possible to prevent the quality of an image from deteriorating due to the ionic impurities.

Main Advantages of Embodiment

In the liquid crystal device 100 according to this embodiment, as described above, the peripheral electrodes 8a to which the potential Vtrap different from the common potential Vcom is applied are formed in the peripheral region 10b of the element substrate 10. Therefore, since the ionic impurities do not cohere in the image display region 10a, it is possible to prevent display quality from deteriorating due to the ionic impurities. In this embodiment, the dummy pixel electrodes 9b are formed in the peripheral region 10b in order to reduce the difference in the height of the surface insulation film 17 between the image display region 10a and the peripheral region 10b. Further, in this embodiment, the peripheral electrodes 8a for trapping the ionic impurities are formed at the positions overlapping the dummy pixel electrodes 9b. Therefore, even when the dummy pixel electrodes 9b are formed, the peripheral electrodes 8a can be formed at the positions at which the distance from the image display region 10a is appropriate. Accordingly, it is possible to prevent the ionic impurities trapped in the peripheral electrodes 8a from having an influence on the image display region 10a. Further, it is possible to reliably draw the ionic impurities which are likely to cohere in the image display region 10a. Thus, it is possible to reliably prevent the display quality from deteriorating due to the ionic impurities.

Although the peripheral circuit section 106 is formed in the peripheral region 10b on the side of the lower layer of the dummy pixel electrodes 9b, the electric influence at the time of applying the alternate-current potential (Vtrap) to the peripheral electrodes 8a can be blocked by the dummy pixel electrodes 9b to which a constant potential (the common potential Vcom) is applied. Accordingly, according to this embodiment, the degree of freedom is improved in terms of the layout of the peripheral circuit section 106, since the peripheral circuit section 106 can be formed at the regions overlapping the dummy pixel electrodes 9b, that is, the regions overlapping the peripheral electrodes 8a.

The capability to trap the ionic impurities in the peripheral electrode 8a is generally proportional to the plane area of the peripheral electrode 8a. In this embodiment, since the dummy pixel electrodes 9b and the peripheral electrodes 8a are formed in the entire circumference of the peripheral region 10b, the formation range of the peripheral electrodes 8a is broad. Therefore, it is possible to effectively trap the ionic impurities.

In the VA mode liquid crystal device 100, the ionic impurities at diagonal angular regions corresponding to a pretilt azimuth are eccentrically located with ease due to the flow when the liquid crystal molecules are completely switched between the vertical posture and horizontally procumbent posture. In this embodiment, however, the peripheral electrodes 8a can efficiently trap the ionic impurities. Further, when an inorganic alignment film is used as the alignment films 16 and 26, the inorganic alignment film tends to adsorb the ionic impurities. In this embodiment, however, the peripheral electrodes 8a can efficiently trap the ionic impurities. Thus, even when the inorganic alignment film is used in the VA mode liquid crystal device 100, it is possible to reliably prevent the ionic impurities from cohering in the image display region 10a.

Second Embodiment

FIGS. 7A and 7B are diagrams illustrating the peripheral electrodes 8a formed in the element substrate 10 of the liquid crystal device 100 according to a second embodiment of the disclosure. FIG. 7A is a diagram illustrating the layout of all the peripheral electrodes 8a and FIG. 7B is an expanded diagram illustrating the peripheral electrodes 8a. Since the basic configuration of this embodiment is the same as that of the first embodiment, the same reference numerals are given to the common constituent elements and the description thereof will be not repeated.

As shown in FIGS. 7A and 7B, as in the first embodiment, the liquid crystal device 100 according to this embodiment includes the image display region 10a at which the plurality of pixel electrodes 9a is arranged and the peripheral region 10b sandwiched between the image display region 10a and the sealing member 107 in the element substrate 10. In the peripheral region 10b, a part of the peripheral circuit section 106 is formed. The dummy pixel electrodes 9b are formed in a region overlapping the peripheral circuit section 106 on the side of the upper layer in the peripheral region 10b. Further, in the peripheral region 10b, the peripheral electrodes 8a for trapping the ionic impurities are formed in the regions overlapping the dummy pixel electrodes 9b on the side of the upper layer.

In this embodiment, in at least a region overlapping the peripheral circuit section 106, the peripheral electrodes 8a are formed of a plurality of strip-shaped electrodes 8b extending in parallel along the regions overlapping the plurality of dummy pixel electrodes 9b. In this embodiment, all the peripheral electrodes 8a are formed of the plurality of strip-shaped electrodes 8b extending in parallel along the regions overlapping the plurality of dummy pixel electrodes 9b. Further, the plurality of strip-shaped electrodes 8b are formed in a rectangular frame shape, since the respective strip-shaped electrodes 8b are formed in the entire circumference of the peripheral region 10b. Therefore, the peripheral electrodes 8a are formed by the multiple strip-shaped electrodes 8b.

The pitch (pitch in a line width direction) of the strip-shaped electrodes 8b is the same as the pitch of the dummy pixel electrodes 9b in a direction perpendicular to the extension direction of the strip-shaped electrodes 8b. Further, the line width of the strip-shaped electrodes 8b is smaller than the size of the dummy pixel electrodes 9b in the direction perpendicular to the extension direction of the strip-shaped electrodes 8b. Thus, the strip-shaped electrodes 8b are located inside the ends of the dummy pixel electrodes 9b overlapping on the side of the lower layer in the line width direction.

Even with such a configuration, since the peripheral electrodes 8a to which a potential different from the common potential Vcom is applied are formed in the peripheral region 10b of the element substrate 10, the ionic impurities do not cohere in the image display region 10a. Therefore, it is possible to prevent the display quality from deteriorating due to the ionic impurities. In this embodiment, the dummy pixel electrodes 9b are formed in the peripheral region 10b, but the peripheral electrodes 8a for trapping the ionic impurities are formed at the positions overlapping the dummy pixel electrodes 9b. Accordingly, even when the dummy pixel electrodes 9b are formed, the peripheral electrodes 8a can be formed at positions at which a distance from the image display region 10a is appropriate. Further, in the peripheral region 10b, the peripheral circuit section 106 is formed on the side of the lower layer of the dummy pixel electrodes 9b. However, the electric influence at the time of applying the alternate-current potential (Vtrap) to the peripheral electrodes 8a can be blocked by the dummy pixel electrodes 9b to which the constant potential (the common potential Vcom) is applied. According to this embodiment, it is possible to obtain substantially the same advantage as that of the first embodiment in that the degree of freedom is improved in terms of the layout of the peripheral circuit section 106, since the peripheral circuit section 106 can be formed at the regions overlapping the dummy pixel electrodes 9b, that is, the regions overlapping the peripheral electrodes 8a.

In this embodiment, the peripheral electrodes 8a are formed of the plurality of strip-shaped electrodes 8b extending in parallel along the regions overlapping the plurality of dummy pixel electrodes 9b. Further, the pitch (the pitch in the line width direction) of the strip-shaped electrodes 8b is the same as the pitch of the dummy pixel electrode 9b in the direction perpendicular to the extension direction of the strip-shaped electrodes 8b. The line width of the strip-shaped electrodes 8b is smaller than the size of the dummy pixel electrodes 9b in the direction perpendicular to the extension direction of the strip-shaped electrodes 8b. Therefore, the strip-shaped electrode 8b is located inside the end of the dummy pixel electrode 9b overlapping in the side of the lower layer in the line width direction. Thus, since the strip-shaped electrode 8b exceeds the dummy pixel electrode 9b and thus the area of the region is very small, the electric influence at the time of applying the alternate-current potential to the peripheral electrodes 8a can efficiently be blocked by the dummy pixel electrodes 9b to which the constant potential (the common potential Vcom) is applied.

Modified Example of Second Embodiment

FIGS. 8A and 8B are expanded views illustrating the peripheral electrodes 8a formed in the element substrate 10 of the liquid crystal device 100 according to a modified example of the second embodiment of the disclosure. FIG. 8A is a diagram illustrating a case where only the portions of the peripheral electrodes 8a overlapping the peripheral circuit section 106 are formed as strip-shaped electrodes and FIG. 8B is a diagram illustrating a case where the peripheral electrodes 8a are formed in the same shape as that of the dummy pixel electrodes 9b. Since the basic configuration of this example is the same as that of the first embodiment, the same reference numerals are given to the common constituent elements and the description thereof will be not repeated.

As shown in FIG. 8A, as in the first embodiment, the liquid crystal device 100 according to this modified example includes the image display region 10a at which the plurality of pixel electrodes 9a is arranged and the peripheral region 10b sandwiched between the image display region 10a and the sealing member 107 in the element substrate 10. In the peripheral region 10b, a part (for example, see FIGS. 3A and 3B) of the peripheral circuit section 106 is formed. The dummy pixel electrodes 9b are formed in a region overlapping the peripheral circuit section 106 on the side of the upper layer in the peripheral region 10b. Further, in the peripheral region 10b, the peripheral electrodes 8a for trapping the ionic impurities are formed in the regions overlapping the dummy pixel electrodes 9b on the side of the upper layer.

In this modified example, in a region overlapping the peripheral circuit section 106, the peripheral electrodes 8a are formed of the plurality of strip-shaped electrodes 8b extending in parallel along the regions overlapping the plurality of dummy pixel electrodes 9b. On the other hand, the line width size of the peripheral electrode 8a corresponds to the width size of the plurality of dummy pixel electrodes 9b in a region overlapping no peripheral circuit section 106. Even with such a configuration, the electric influence at the time of applying the alternate-current potential to the peripheral electrodes 8a can be blocked by the dummy pixel electrodes 9b to which the constant potential (the common potential Vcom) is applied. Accordingly, in this modified example, it is possible to obtain substantially the same advantage as that of the first embodiment in that the degree of freedom is improved in terms of the layout of the peripheral circuit section 106, since the peripheral circuit section 106 can be formed at the regions overlapping the dummy pixel electrodes 9b, that is, the regions overlapping the peripheral electrodes 8a.

The capability to trap the ionic impurities in the peripheral electrode 8a is generally proportional to the plane area of the peripheral electrode 8a. In this modified example, the line width size of the peripheral electrode 8a is large in the region overlapping no peripheral circuit section 106. Therefore, it is possible to realize an excellent capability to trap the ionic impurities.

As shown in FIG. 8B, as in the first embodiment, the liquid crystal device 100 according to this modified example includes the image display region 10a at which the plurality of pixel electrodes 9a is arranged and the peripheral region 10b sandwiched between the image display region 10a and the sealing member 107 in the element substrate 10. In the peripheral region 10b, a part (for example, see FIGS. 3A and 3B) of the peripheral circuit section 106 is formed. The dummy pixel electrodes 9b are formed in a region overlapping the peripheral circuit section 106 on the side of the upper layer in the peripheral region 10b. Further, in the peripheral region 10b, the peripheral electrodes 8a for trapping the ionic impurities are formed in the regions overlapping the dummy pixel electrodes 9b on the side of the upper layer.

In this modified example, the peripheral electrode 8a is slightly smaller than the dummy pixel electrode 9b and is formed of the strip-shaped electrode 8b having the same shape as that of the dummy pixel electrode 9b. More specifically, as in the dummy pixel electrode 9b, the peripheral electrode 8a includes a plurality of rectangular portions 8a1 and connection portions 8a2 having a width size narrower than that of the rectangular portions 8a1 and connecting the rectangular portions 8a1 to each other. Therefore, the peripheral electrode 8a does not exceed the dummy pixel electrode 9b. With such a configuration, the electric influence at the time of applying the alternate-current potential to the peripheral electrodes 8a can reliably be blocked by the dummy pixel electrodes 9b to which the constant potential (the common potential Vcom) is applied. Accordingly, in this modified example, it is possible to achieve the high degree of freedom in terms of the layout of the peripheral circuit section 106, since the peripheral circuit section 106 can be formed at the regions overlapping the dummy pixel electrodes 9b, that is, the regions overlapping the peripheral electrodes 8a.

Other Embodiments

In the above-described embodiments, the peripheral electrodes 8a are continuously formed in the entire circumference. However, the peripheral electrodes 8a may be partially disconnected as long as the ionic impurity trapping potential Vtrap is applicable. Further, in the above-described embodiments, the peripheral electrodes 8a are continuously formed in the entire circumference. However, for example, when the peripheral electrodes 8a are formed in only corner portions, the disclosure may be applicable. In the above-described second embodiment, the same ionic impurity trapping potential Vtrap is applied to the plurality of strip-shaped electrodes 8b forming the peripheral electrodes 8a. Instead, different ionic impurity trapping potentials Vtrap may be applied to the plurality of strip-shaped electrodes 8b.

In the above-described embodiments, the disclosure is applied to the transmissive liquid crystal device 100. Instead, the disclosure may be applied to the reflective liquid crystal device 100.

Example of Mounting on Electronic Apparatus

Figure 9A:
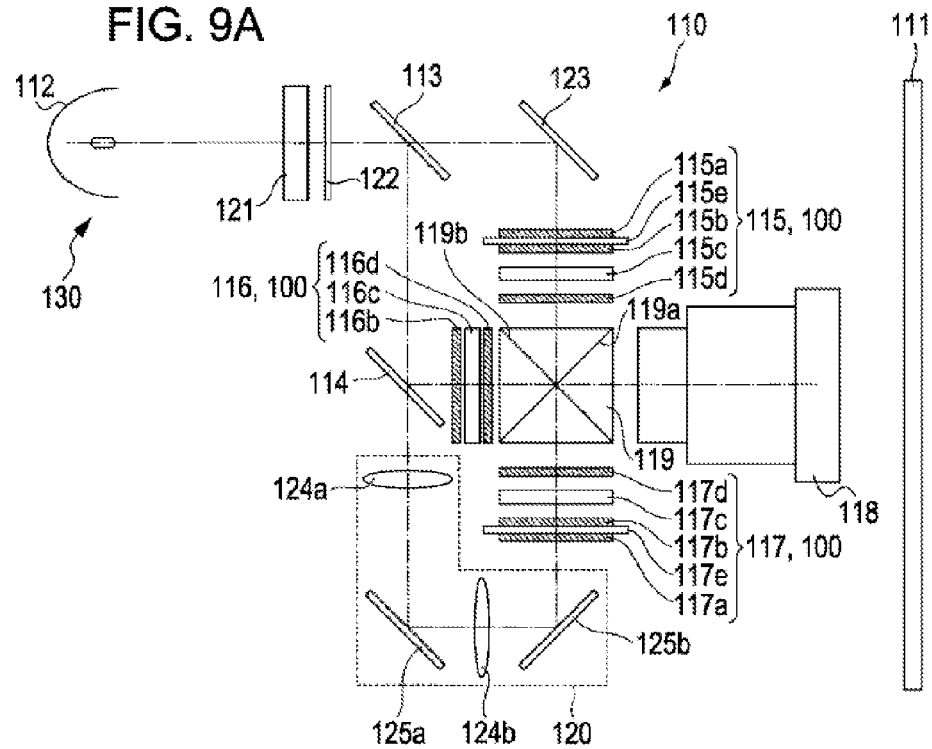
FIGS. 9A and 9B are schematic diagrams illustrating the configuration of a projection-type display apparatus using the liquid crystal device according to the disclosure.
Figure 9B:
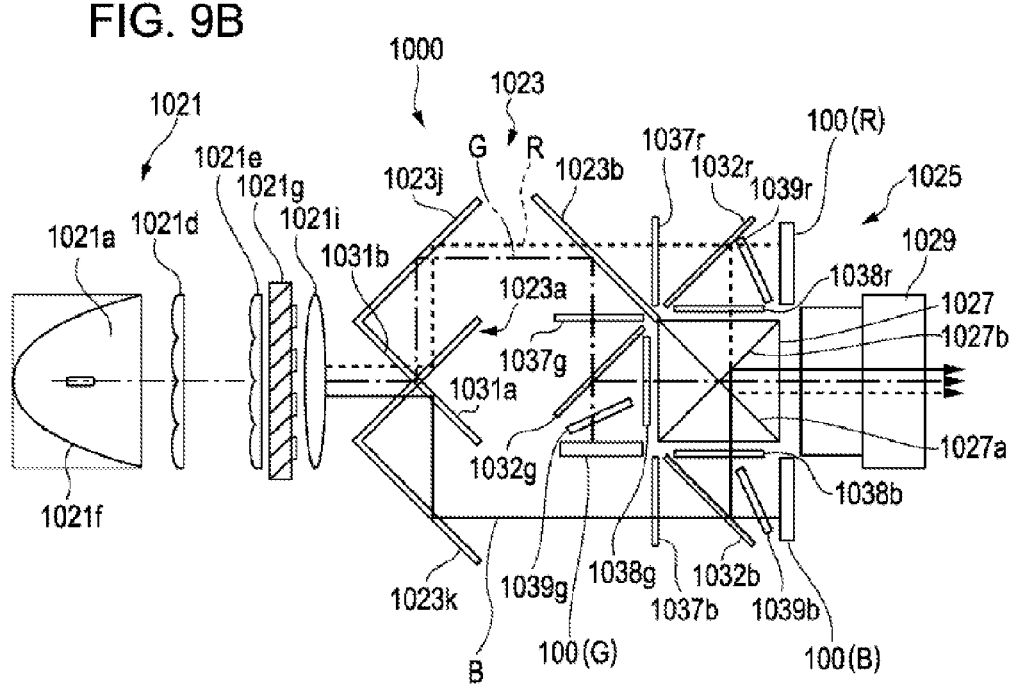

An electronic apparatus to which the liquid crystal device 100 according to the above-described embodiments is applied will be described. FIGS. 9A and 9B are schematic diagrams illustrating a projection-type display apparatus using the liquid crystal device 100 according to the disclosure. FIG. 9A is a diagram illustrating the projection-type display apparatus using the transmissive liquid crystal device 100 and FIG. 9B is a diagram illustrating the projection-type display apparatus using the reflective liquid crystal device 100.

First Example of Projection-type Display Apparatus

A projection-type display apparatus 110 shown in FIG. 9A is a so-called projection-type display apparatus which emits light to a screen 111 installed on the side of an observer and observes the light reflected from the screen 111. The projection-type display apparatus 110 includes a light source unit 130 including a light source 112, dichroic mirrors 113 and 114, liquid crystal light valves 115 to 117 (liquid crystal devices 100), a projection optical system 118, a cross-dichroic prism 119, and a relay system 120.

The light source 112 includes a high-pressure mercury lamp which supplies light including red light, green light, and blue light. The dichroic mirror 113 passes the red light from the light source 112 and reflects the green light and the blue light. The dichroic mirror 114 passes the blue light between the green light and the blue light reflected from the dichroic mirror 113 and reflects the green light. In this way, the dichroic mirrors 113 and 114 form a color separation optical system which separates the light emitted from the light source 112 into red light, green light, and blue light.

Here, between the dichroic mirror 113 and the light source 112, an integrator 121 and a polarization conversion element 122 are disposed in order from the light source 112. The integrator 121 is configured to uniformize the illuminance distribution of the light emitted from the light source 112. The polarization conversion element 122 is configured to allow the light from the light source 112 to be polarized light with a specific vibration direction such as s-polarized light.

The liquid crystal light valve 115 is the transmissive liquid crystal device 100 which modulates the red light passing through the dichroic mirror 113 and reflected from a reflection mirror 123 in accordance with an image signal. The liquid crystal light valve 115 includes a λ/2 phase difference plate 115a, a first polarization plate 115b, a liquid crystal panel 115c, and a second polarization plate 115d. Here, the red light incident on the liquid crystal light valve 115 remains s-polarized light since the polarization of the red light which passes through the dichroic mirror 113 is not changed.

The λ/2 phase difference plate 115a is an optical element which converts the s-polarized light incident on the liquid crystal light valve 115 into p-polarized light. The first polarization plate 115b is a polarization plate which blocks the s-polarized light while transmitting the p-polarized light. The liquid crystal panel 115c is configured to convert the p-polarized light into the s-polarized light (circularly polarized light or elliptically polarized light in a case of halftone) through modulation in accordance with the image signal. The second polarization plate 115d is a polarization plate which blocks the p-polarized light while transmitting the s-polarized light. Accordingly, the liquid crystal light valve 115 is configured to modulate the red light in accordance with the image signal and emit the modulated red light toward the cross-dichroic prism 119.

The λ/2 phase difference plate 115a and the first polarization plate 115b are disposed so as to come into contact with a light-transmission glass plate 115e, which does not change polarization. Therefore, it is possible to prevent the λ/2 phase difference plate 115a and the first polarization plate 115b from being distorted due to heating.

The liquid crystal light valve 116 is the transmissive liquid crystal device 100 which modulates the green light reflected from the dichroic mirror 113 and then reflected from the dichroic mirror 114 in accordance with the image signal. The liquid crystal light valve 116 includes a first polarization plate 116b, a liquid crystal panel 116c, and a second polarization plate 116d, as in the liquid crystal light valve 115. The green light incident on the liquid crystal light valve 116 is an s-polarized light which is reflected from the dichroic mirrors 113 and 114 and is incident. The first polarization plate 116b is a polarization plate which blocks the p-polarized light while transmitting the s-polarized light. The liquid crystal panel 116c is configured to convert the s-polarized light into the p-polarized light (circularly polarized light or elliptically polarized light in a case of halftone) through modulation in accordance with the image signal. The second polarization plate 116d is a polarization plate which blocks the s-polarized light while transmitting the p-polarized light. Accordingly, the liquid crystal light valve 116 is configured to modulate the green light in accordance with the image signal and emit the modulated green light toward the cross-dichroic prism 119.

The liquid crystal light valve 117 is the transmissive liquid crystal device 100 which modulates the blue light reflected from the dichroic mirror 113, passing through the dichroic mirror 114, and then passing by the relay system 120 in accordance with the image signal. The liquid crystal light valve 117 includes a λ/2 phase difference plate 117a, a first polarization plate 117b, a liquid crystal panel 117c, and a second polarization plate 117d, as in the liquid crystal light valves 115 and 116. Here, the blue light incident on the liquid crystal light valve 117 becomes s-polarized light since the light is reflected from the dichroic mirror 113, passes through the dichroic mirror 114, and then is reflected from two reflection mirror 125a and 125b of a relay system 120 described below.

The λ/2 phase difference plate 117a is an optical element which converts the s-polarized light incident on the liquid crystal light valve 117 into the p-polarized light. The first polarization plate 117b is a polarization plate which blocks the s-polarized light while transmitting the p-polarized light. The liquid crystal panel 117c is configured to convert the p-polarized light into the s-polarized light (circularly polarized light or elliptically polarized light in a case of halftone) through modulation in accordance with the image signal. The second polarization plate 117d is a polarization plate which blocks the p-polarized light while transmitting the s-polarized light. Accordingly, the liquid crystal light valve 117 is configured to modulate the blue light in accordance with the image signal and emit the modulated blue light toward the cross-dichroic prism 119. The λ/2 phase difference plate 117a and the first polarization plate 117b are disposed so as to come into contact with a glass plate 117e.

The relay system 120 includes relay lenses 124a and 124b and reflection mirrors 125a and 125b. The relay lenses 124a and 124b are installed to prevent light loss due to the long light path of the blue light. Here, the relay lens 124a is disposed between the dichroic mirror 114 and the reflection mirror 125a. The relay lens 124b is disposed between the reflection mirrors 125a and 125b. The reflection mirror 125a is disposed so as to reflect the blue light passing through the dichroic mirror 114 and emitted from the relay lens 124a toward the relay lens 124b. Further, the reflection mirror 125b is disposed so as to reflect the blue light emitted from the relay lens 124b toward the liquid crystal light valve 117.

The cross-dichroic prism 119 is a color synthesizing optical system in which two dichroic films 119a and 119b are disposed perpendicularly in an X shape. The dichroic film 119a is a film which reflects blue light while transmitting green light. The dichroic film 119b is a film which reflects red light while transmitting green light. Accordingly, the cross-dichroic prism 119 is configured to synthesize the red light, the green light, and the blue light modulated by the liquid crystal light valves 115, 116, and 117, respectively and emit the synthesized light toward the projection optical system 118.

The light incident on the cross-dichroic prism 119 from the liquid crystal light valves 115 and 117 is s-polarized light. The light incident on the cross-dichroic prism 119 from the liquid crystal light valve 116 is p-polarized light. Thus, since the light incident on the cross-dichroic prism 119 can be configured to the different kinds of polarized light, the light incident from the liquid crystal light valves 115 to 117 can be synthesized by the cross-dichroic prism 119. Here, the dichroic films 119a and 119b are generally excellent in reflection transistor characteristics of the s-polarized light. Therefore, the red light and the blue light reflected from the dichroic films 119a and 119b are configured to be the s-polarized light and the green light passing through the dichroic films 119a and 119b is configured to be the p-polarized light. Since the projection optical system 118 further includes a projection lens (not shown), the light synthesized by the cross-dichroic prism 119 is configured to be projected to the screen 111.

Second Example of Projection-type Display Apparatus

A projection-type display apparatus 1000 shown in FIG. 9B includes a light source unit 1021 generating source light, a color separation guiding optical system 1023 separating the source light emitted from the light source unit 1021 into three colors of red, green, and blue, and a light modulation unit 1025 illuminated with the source light of the respective colors emitted from the color separation guiding optical system 1023. The projection-type display apparatus 1000 further includes a cross-dichroic prism 1027 (synthesizing optical system) synthesizing image light of respective colors emitted from the light modulation unit 1025 and a projection optical system 1029 which is a projection optical system projecting the image light coming from the cross-dichroic prism 1027 to a screen (not shown).

In the projection-type display apparatus 1000, the light source unit 1021 includes a light source 1021a, a pair of fly-eye optical systems 1021d and 1021e, a polarization conversion member 1021g, and a superimposed lens 1021i. In this example, the light source unit 1021 includes a reflector 1021f formed by a paraboloid surface and emits parallel light. The fly-eye optical systems 1021d and 1021e, which are configured by a plurality of element lenses disposed in a matrix form in a surface perpendicular to a system optical axis, separate the source light by the element lenses and individually condense and emit the light. The polarization conversion member 1021g converts the source light emitted from the fly-eye optical system 1021e into light of only the p-polarized component parallel, for example, in the drawing and supplies the converted light to an optical system on the downstream side of a light path. The superimposed lens 1021i overall and appropriately converges the source light passing by the polarization conversion member 1021g, and thus can uniformly superimpose and illuminate each of the plurality of liquid crystal devices 100 formed in the light modulation unit 1025.

The color separation guiding optical system 1023 includes a cross-dichroic mirror 1023a, a dichroic mirror 1023b, and reflection mirrors 1023j and 1023k. In the color separation guiding optical system 1023, the substantially white source light from the light source unit 1021 is incident on the cross-dichroic mirror 1023a. Red (R) light reflected from a first dichroic mirror 1031a, which is one of the mirrors included in the cross-dichroic mirror 1023a, is reflected from the reflection mirror 1023j, passes through the dichroic mirror 1023b, and then is incident on the red (R) liquid crystal device 100, remaining in the p-polarized state, via an incident-side polarization plate 1037r, a wire grid polarization plate 1032r transmitting p-polarized light while reflecting s-polarized light, and an optical compensation plate 1039r.

Green (G) light reflected from the first dichroic mirror 1031a is reflected from the reflection mirror 1023j, is also reflected from the dichroic mirror 1023b, and then is incident on a green (G) liquid crystal device 100, remaining in a p-polarized state, via an incident-side polarization plate 1037g, a wire grid polarization plate 1032g transmitting the p-polarized light while reflecting the s-polarized light, and an optical compensation plate 1039g.

On the other hand, blue (B) light reflected from a second dichroic mirror 1031b, which is the other of the mirrors included in the cross-dichroic mirror 1023a, is reflected from a reflection mirror 1023k and is incident on the blue (B) liquid crystal device 100, remaining in a p-polarized state, via an incident-side polarization plate 1037b, a wire grid polarization plate 1032b transmitting the p-polarized light while reflecting the s-polarized light, and an optical compensation plate 1039b.

The optical compensation plates 1039r, 1039g, and 1039b optically compensate the characteristics of the liquid crystal layer by adjusting the polarized state of the light incident on and the light exiting to the liquid crystal devices 100.

In the projection-type display apparatus 1000 with the above-described configuration, the light of three colors incident via the optical compensation plates 1039r, 1039g, and 1039b is modulated in the respective liquid crystal devices 100. At this time, among the modulated light emitted from the liquid crystal devices 100, the light of the s-polarized component is reflected from the wire grid polarization plates 1032r, 1032g, and 1032b and is incident on the cross-dichroic prism 1027 via exit-side polarization plates 1038r, 1038g, and 1038b, respectively. A first dielectric multilayer film 1027a and a second dielectric multilayer film 1027b which intersect each other in an X shape are formed in the cross-dichroic prism 1027. The first dielectric multilayer film 1027a, which is one of these films, reflects the R light, whereas the second dielectric multilayer film 1027b, which is the other of these films, reflects the B light. Accordingly, the light of three colors is synthesized in the cross-dichroic prism 1027, and then the synthesized light exits to the projection optical system 1029. The projection optical system 1029 projects color image light synthesized in the cross-dichroic prism 1027 toward the screen (not shown) at a desired magnification.

Another Projection-type Display Apparatus

In the projection-type display apparatus, LED light sources or the like emitting light of respective colors from the light source unit may be used. The color light emitted from the LED light sources may be configured to be supplied to different liquid crystal devices.

Other Electronic Apparatuses

The liquid crystal device 100 according to the disclosure may be used as a direct-view display device of an electronic apparatus such as a mobile telephone, a personal digital assistant (PDA), a digital camera, a liquid crystal television, a car navigation apparatus, a television telephone, a POS terminal, an apparatus with a touch panel as well as the above-mentioned electronic apparatuses.

What is claimed is:

1. A liquid crystal device comprising:
    an element substrate having a one surface, a plurality of pixel electrodes being arranged on the one surface forming an image display region;
    a counter substrate;
    a common electrode formed on the counter substrate to which a common potential is applied;
    a sealing member which bonds the element substrate and the counter substrate; and
    a liquid crystal layer held in a region surrounded by the sealing member between the element substrate and the counter substrate,
    wherein the one surface of the element substrate includes
        a plurality of conductive patterns formed of a conductive film in a peripheral region between the image display region and the sealing member, the conductive patterns formed at a same layer as the plurality of pixel electrodes,
        an insulation film formed on a side facing the counter substrate so as to correspond to the plurality of conductive patterns and the plurality of pixel electrodes, and
        peripheral electrodes to which a potential different from the common potential is applied, the peripheral electrodes formed in a region overlapping the plurality of conductive patterns in a plan view on a side on which the counter substrate is located so as to correspond to the insulation film in the peripheral region.

2. The liquid crystal device according to claim 1, wherein the peripheral region includes a peripheral circuit section comprising a peripheral circuit and signal wirings formed in the region overlapping the plurality of conductive patterns in the plan view on a side opposite to the side on which the counter substrate is located.

3. The liquid crystal device according to claim 1, wherein the peripheral electrodes are formed in substantially a same shape as the conductive patterns.

4. The liquid crystal device according to claim 2, wherein the peripheral electrodes comprise a plurality of strip-shaped electrodes extending along the region overlapping the plurality of conductive patterns in at least a region overlapping the peripheral circuit section in the plan view.

5. The liquid crystal device according to claim 4, wherein the strip-shaped electrodes are formed in a rectangular frame shape along the entire circumference of the peripheral region.

6. The liquid crystal device according to claim 4, wherein a pitch of the plurality of strip-shaped electrodes is equal to a pitch of the plurality of conductive patterns in a direction perpendicular to an extension direction of the plurality of strip-shaped electrodes.

7. The liquid crystal device according to claim 4, wherein a line width of the plurality of strip-shaped electrodes is smaller than a dimension of the plurality of conductive patterns in a direction perpendicular to an extension direction of the plurality of strip-shaped electrodes.

8. The liquid crystal device according to claim 1, wherein the plurality of conductive patterns and the peripheral electrodes are formed along an entire circumference of the peripheral region.

9. The liquid crystal device according to claim 1, further comprising an alignment film formed on a side on which the counter substrate is located so as to correspond to the peripheral electrodes.

10. The liquid crystal device according to claim 9, wherein the alignment film consists of an inorganic alignment film.

11. The liquid crystal device according to claim 1, wherein the liquid crystal layer comprises a nematic liquid crystal compound in which a dielectric anisotropy is negative.

12. The liquid crystal device according to claim 1, further comprising:
    an inorganic alignment film formed on a side on which the counter substrate is located so as to correspond to the peripheral electrodes, and wherein the liquid crystal layer comprises a nematic liquid crystal compound in which a dielectric anisotropy is negative.

13. The liquid crystal device according to claim 1, wherein the conductive patterns comprise dummy pixel electrodes.

14. A projection-type display apparatus comprising:
    the liquid crystal device according to claim 1;
    a light source unit which radiates the liquid crystal device with a light; and
    a projection optical system which projects the light modulated by the liquid crystal device.

* * * * *